(12) United States Patent
Chopra et al.

(10) Patent No.: US 12,541,609 B2
(45) Date of Patent: Feb. 3, 2026

(54) METHOD AND SYSTEM FOR IDENTIFYING HEALTH OF A MICROSERVICE BASED ON RESOURCE UTILIZATION OF THE MICROSERVICE

(71) Applicant: Dell Products L.P., Round Rock, TX (US)

(72) Inventors: Shelesh Chopra, Bangalore (IN); Gururaj Kulkarni, Bangalore (IN); Mahantesh Ambaljeri, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 400 days.

(21) Appl. No.: 18/154,480

(22) Filed: Jan. 13, 2023

(65) Prior Publication Data

US 2024/0241978 A1 Jul. 18, 2024

(51) Int. Cl.
*G06F 21/62* (2013.01)

(52) U.S. Cl.
CPC .................. *G06F 21/6218* (2013.01)

(58) Field of Classification Search
CPC .................................................. G06F 21/6218
See application file for complete search history.

(56) References Cited

U.S. PATENT DOCUMENTS

| | | | |
|---|---|---|---|
| 9,769,756 B1 * | 9/2017 | Cui | H04W 52/0222 |
| 10,511,481 B1 * | 12/2019 | Castellanos | H04L 41/0883 |
| 2007/0162260 A1 * | 7/2007 | Nordstrom | G06F 9/505 |
| | | | 702/182 |
| 2015/0149776 A1 * | 5/2015 | Chastain | H04L 63/061 |
| | | | 713/168 |
| 2015/0227602 A1 * | 8/2015 | Ramu | G06F 11/1456 |
| | | | 707/634 |
| 2018/0232113 A1 * | 8/2018 | Ham | G06F 1/329 |
| 2018/0324219 A1 * | 11/2018 | Xie | H04L 63/0209 |
| 2020/0112497 A1 * | 4/2020 | Yenumulapalli | H04L 43/10 |
| 2022/0236893 A1 * | 7/2022 | Saad | G06F 16/2255 |
| 2023/0028774 A1 * | 1/2023 | Dawkins | G06F 11/3055 |
| 2023/0267104 A1 * | 8/2023 | Vithalkar | G06F 16/285 |
| | | | 707/687 |
| 2024/0135229 A1 * | 4/2024 | Bandyopadhyay | G06N 20/00 |

* cited by examiner

*Primary Examiner* — Daniel B Potratz
*Assistant Examiner* — Matthias Habtegeorgis
(74) *Attorney, Agent, or Firm* — Chamberlain, Hrdlicka, White, Williams & Aughtry; Aly Z. Dossa

(57) ABSTRACT

A method for managing a data protection module (DPM) includes: obtaining resource utilization data of a first microservice (FM) and a second microservice (SM); deriving, based on the resource utilization data and for the FM and the SM, resource utilization values (RUVs) for each resource; identifying, based on the RUVs, health of the FM and the SM; tagging, based on the identified health of the FM and the SM, the FM and the SM; obtaining a first confidence score (CS) associated with the tag of the FM and a second CS associated with the tag of the SM; generating a ranked list (RL) based on the first CS and the second CS, in which the RL comprises the FM and the SM ordered based on their respective CSs; and sending, based on the RL, a recommendation to the DPM to manage the health of the FM and the SM.

20 Claims, 7 Drawing Sheets

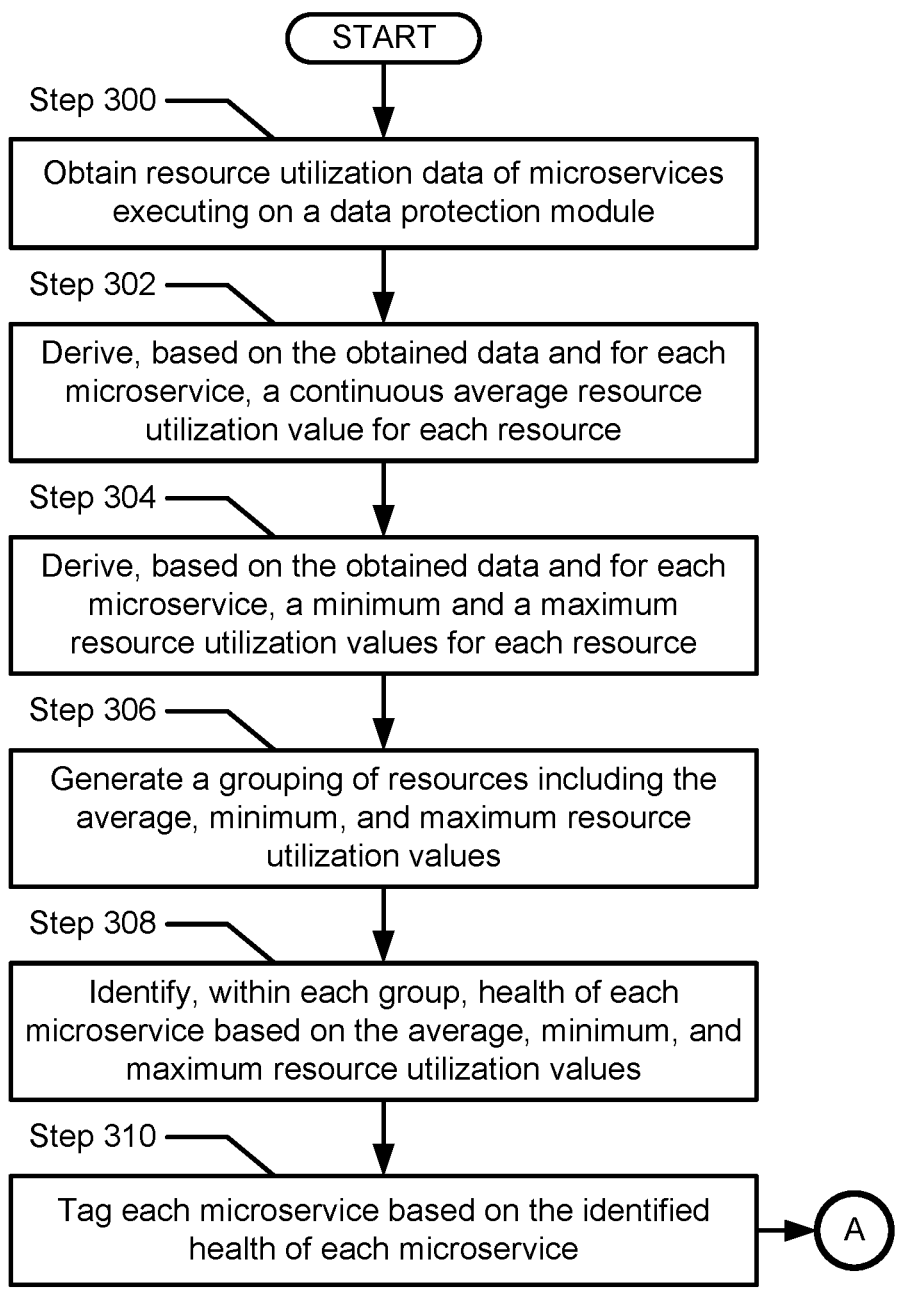
FIG. 3.1

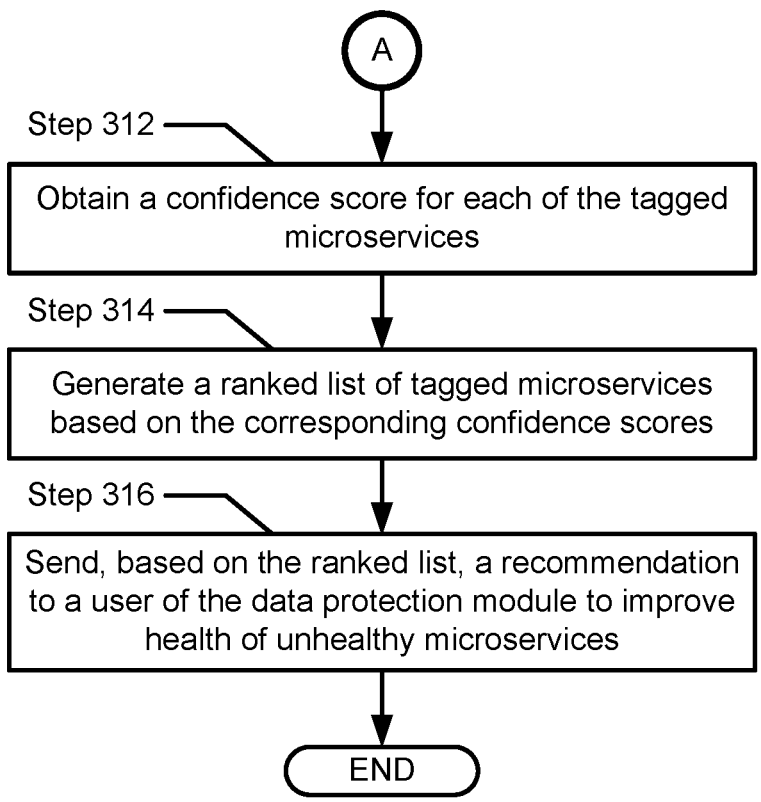
FIG. 3.2

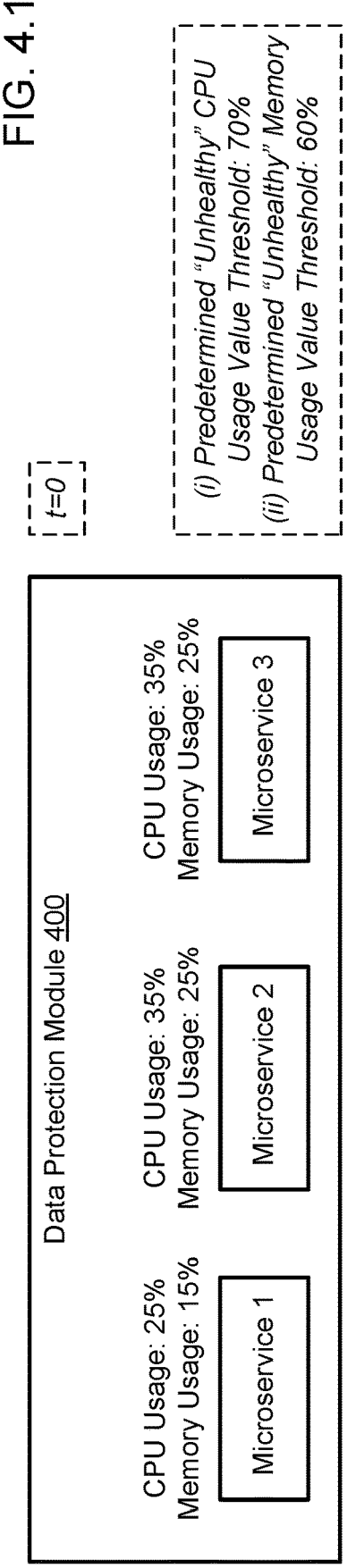
FIG. 4.1
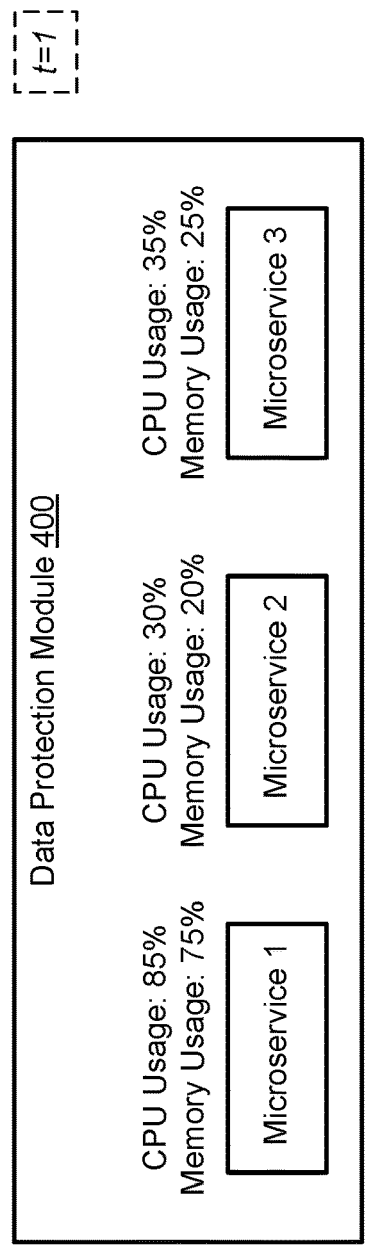
FIG. 4.2

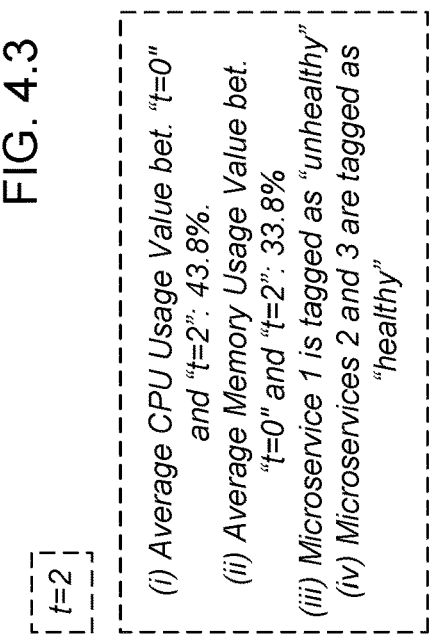
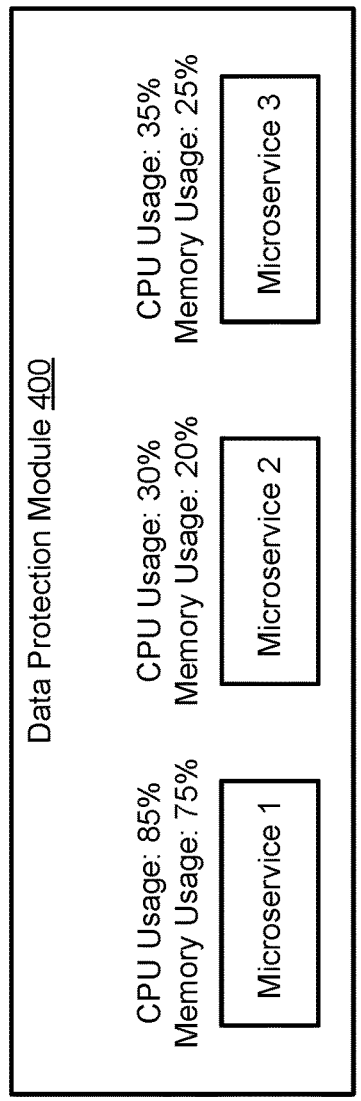
FIG. 4.3
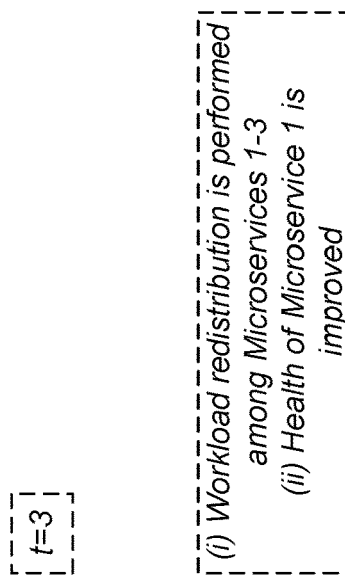
FIG. 4.4

METHOD AND SYSTEM FOR IDENTIFYING HEALTH OF A MICROSERVICE BASED ON RESOURCE UTILIZATION OF THE MICROSERVICE

BACKGROUND

Computing devices may provide services. To provide the services, the computing devices may include hardware components and software components. The software components may store information usable to provide the services using the hardware components.

BRIEF DESCRIPTION OF DRAWINGS

Certain embodiments of the invention will be described with reference to the accompanying drawings. However, the accompanying drawings illustrate only certain aspects or implementations of the invention by way of example, and are not meant to limit the scope of the claims.

FIGS. 3.1 and 3.2 show a method for identifying health of one or more microservices based on their resource utilizations in accordance with one or more embodiments of the invention.

FIGS. 4.1-4.4 show an example use case in accordance with one or more embodiments of the invention.

DETAILED DESCRIPTION

Figure 1:
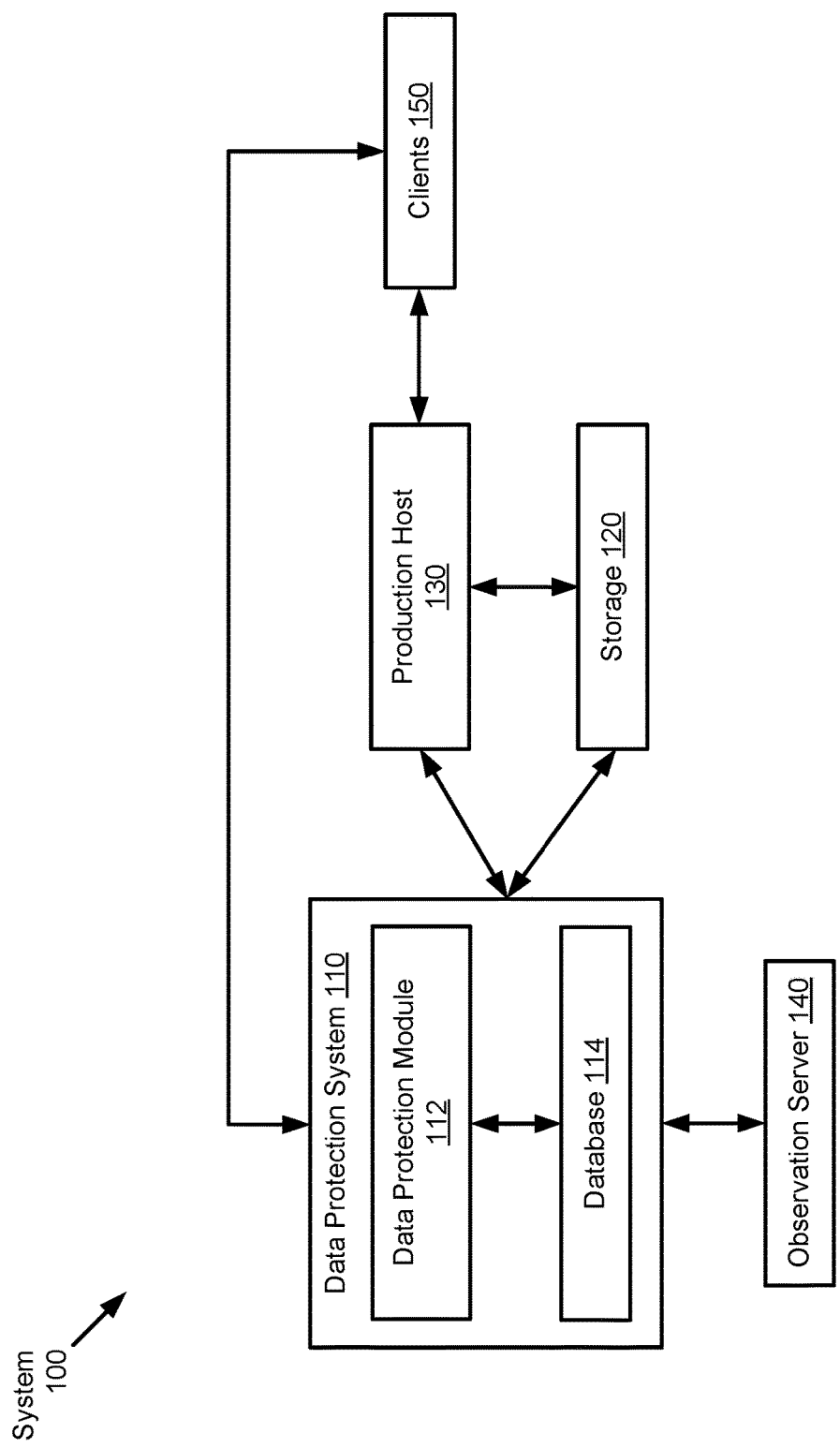
FIG. 1 shows a diagram of a system in accordance with one or more embodiments of the invention.

Specific embodiments of the invention will now be described in detail with reference to the accompanying figures. In the following detailed description of the embodiments of the invention, numerous specific details are set forth in order to provide a more thorough understanding of one or more embodiments of the invention. However, it will be apparent to one of ordinary skill in the art that the one or more embodiments of the invention may be practiced without these specific details. In other instances, well-known features have not been described in detail to avoid unnecessarily complicating the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items, and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure, and the number of elements of the second data structure, may be the same or different.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct connection (e.g., wired directly between two devices or components) or indirect connection (e.g., wired and/or wireless connections between any number of devices or components connecting the operatively connected devices). Thus, any path through which information may travel may be considered an operative connection.

In general, a distributed microservices architecture (e.g., a distributed computing system, a system that includes a set of microservices, etc.) is one of the building blocks for generating complex application stacks (e.g., software applications, modules, etc.). The distributed microservices architecture is becoming a de-facto choice for applications (e.g., cloud-native applications, data protection applications, web applications, etc.) that execute based on microservices in order to, for example, (i) minimize multiple level of dependencies in agile methodologies (e.g., project management methodologies, software development methodologies, etc.) and operations, (ii) improve various different go-to market strategies, and (iii) decentralize development efforts that are needed in the agile methodologies.

In most cases, each microservice performs one or more tasks (which are independent of other microservices) and communicates with other microservices using, for example, representational state transfer application programming interfaces (REST APIs). Resource requirements (e.g., memory requirements, central processing unit (CPU) requirements, etc.) of a microservice may vary and today's applications (that are generated based on the distributed microservices architecture) are mostly being focused on dynamically adjusting the resource requirements of microservices. For example, consider a scenario where a highly distributed and multi microservices-based architecture receives an urgent request (e.g., an urgent data protection request) from a user. This request may trigger a spike (e.g., a surge) in resource utilization levels (or values) (e.g., 35% CPU utilization→85% CPU utilization) of one or more microservices, which may occur less frequently; however, when this scenario occurs, failure impact of the microservices may be high and the entire architecture may get affected.

In order to serve the request, the architecture may incorporate one or more microservices from its, for example, business services (e.g., data management services), core services (e.g., authentication services, workflow management services, etc.), and infrastructure services (e.g., database services) so that each microservice may interact with each other to serve the request. While serving the request, each microservice may consume its own resources and because the request is an urgent request, there may be a surge in resource utilization levels of one or more microservices. Periodic monitoring of resource utilization levels of microservices may not be enough to identify (i) which microservice is a healthy microservice (e.g., a microservice that generates a response to a request) and (ii) which microservice is an unhealthy microservice (e.g., a microservice that does not generate a response to a request, an over-provisioned microservice, etc.). Further, because of the amount of resources that are assigned to each microservice, a surge in resource utilization levels of a microservice may affect other microservices' production workloads (e.g., reading data from a table, writing data to the table, etc.).

For at least the reasons discussed above, unlike only monitoring resource utilization levels of microservices via traditional monitoring tools, a fundamentally different approach (e.g., an approach that identifies health of each microservice and performs, based on the identification, preventive actions to manage health of each microservice) is needed. Embodiments of the invention relate to methods and systems to (i) identify health of each microservice based on each microservice's resource utilization levels and (ii) based on (i), manage health of each microservice. More specifically, the embodiments of the invention may first obtain resource utilization data of a first microservice and a second microservice, in which both microservices are being executed on a data protection module. Based on the resource utilization data and for the first and second microservices, resource utilization levels of each resource may be derived, in which the resource utilization levels include an average, a minimum, and a maximum resource utilization values. Thereafter, based on the resource utilization levels, health of the first and second microservices may be identified. Based on the identified health of the first and second microservices, both microservices may be tagged. A first confidence score associated with the tag of the first microservice and a second confidence score associated with the tag of the second microservice may then be obtained. Based on the first and second confidence scores, a ranked list may be generated, in which the ranked list includes the first and second microservices ordered based on their respective confidence scores. Finally, based on the ranked list, a recommendation may be sent to a user (e.g., an administrator, a developer, etc.) of the data protection module to manage the health of the first and second microservices. As a result of the processes discussed below, one or more embodiments disclosed herein advantageously ensure that: (i) each microservice in a distributed microservices architecture is monitored, (ii) health of each microservice is identified (based on, for example, each microservice's resource utilization levels), and (iii) a recommendation is sent to a user to manage health of each microservice. In this manner, for example, an issue (e.g., workload mismatch between microservices) that is occurred due to a recent surge in resource utilization levels of a microservice may be resolved proactively (without affecting the entire architecture and the data protection module) by taking a preventive action (e.g., performing workload redistribution, reducing the quantity of unnecessary REST API calls, performing workload placement collaboration, etc.).

The following describes various embodiments of the invention.

FIG. 1 shows a diagram of a system (100) in accordance with one or more embodiments of the invention. The system (100) includes any number of clients (150), any number of production hosts (e.g., 130), storage (120), a data protection system (110), and an observation server (140). The system (100) may include additional, fewer, and/or different components without departing from the scope of the invention. Each component may be operably connected to any of the other components via any combination of wired and/or wireless connections. Each component illustrated in FIG. 1 is discussed below.

In one or more embodiments, the clients (150), the production host (130), the storage (120), the data protection system (110), and the observation server (140) may be physical or logical devices, as discussed below.

While FIG. 1 shows a specific configuration of the system (100), other configurations may be used without departing from the scope of the invention. For example, although the clients (150) and the production host (130) are shown to be directly connected, the clients (150) and the production host (130) may be operatively connected through a communication network (not shown). As yet another example, although the clients (150) and the data protection system (110) are shown to be directly connected, the clients (150) and the data protection system (110) may be operatively connected through the communication network.

Further, the functioning of the clients (150) and the data protection system (110) is not dependent upon the functioning and/or existence of the other components (e.g., devices) in the system (100). Rather, the clients (150) and the data protection system (110) may function independently and perform operations locally that do not require communication with other components. Accordingly, embodiments disclosed herein should not be limited to the configuration of components shown in FIG. 1.

As used herein, the term "data" is intended to be broad in scope. In this manner, that term embraces, for example (but not limited to): data segments that are produced by data stream segmentation processes, data chunks, data blocks, atomic data, emails, objects of any type, files of any type (e.g., media files, spreadsheet files, database files, etc.), contacts, directories, sub-directories, volumes, etc.

In one or more embodiments, although terms such as "document", "file", "segment", "block", or "object" may be used by way of example, the principles of the disclosure are not limited to any particular form of representing and storing data or other information. Rather, such principles are equally applicable to any object capable of representing information.

In one or more embodiments, the system (100) may deliver computing power, storage capacity, and data protection (e.g., software-defined data protection) as a service to users of the clients (150). The system (100) may also represent a comprehensive middleware layer executing on computing devices (e.g., 500, FIG. 5) that supports virtualized application environments. In one or more embodiments, the system (100) may support one or more virtual machine (VM) environments (e.g., the production host (130)), and may map capacity requirements (e.g., computational load, storage access, etc.) of VMs and supported applications to available resources (e.g., processing resources, storage resources, etc.) managed by the environments. Further, the system (100) may be configured for workload placement collaboration (for example, between microservices) and computing resource (e.g., processing, storage/memory, virtualization, networking, etc.) exchange.

As used herein, "computing" refers to any operations that may be performed by a computer, including (but not limited to): computation, data storage, data retrieval, communications, etc.

As used herein, a "computing device" refers to any device in which a computing operation may be carried out. A computing device may be, for example (but not limited to): a compute component, a storage component, a network device, a telecommunications component, etc.

In one or more embodiments, as being a physical computing device or a logical computing device, the data protection system (110) may include functionality to, at least: (i) provide software-defined data protection, (ii) provide automated data discovery, protection, management, and recovery operations in on-premises, (iii) provide data deduplication, (iv) orchestrate centralized data protection through a graphical user interface (GUI) of the data protection module (112), (v) empower data owners (e.g., users of the clients (150)) to perform self-service data backup and restore operations from their native applications, (vi) ensure compliance and satisfy different types of service level objectives, (vii) enable virtualized and cloud deployments, including automated data discovery, protection, management, and recovery operations for in-cloud workloads, (viii) enable data discovery, protection, management, and recovery operations for cloud-native workloads (e.g., an application that was designed to reside in a cloud environment) across multiple cloud environments, (ix) simplify VM image backups of a VM with near-zero impact on the VM, (x) streamline data protection for applications and/or containers (e.g., Kubernetes® containers), (xi) increase resiliency of an organization by enabling rapid recovery or cloud disaster recovery from cyber incidents, (xii) provide long-term data retention, (xiii) provide dynamic network-attached storage (NAS) backup and recovery, and (xiv) provide operational simplicity, agility, and flexibility for physical, virtual, and cloud-native information technology (IT) environments. One of ordinary skill will appreciate that the data protection system (110) may perform other functionalities without departing from the scope of the invention.

In one or more embodiments, the GUI may be displayed on a display of a computing device (e.g., 500, FIG. 5) using functionalities of a display engine (not shown), in which the display engine is operatively connected to the computing device. The display engine may be implemented using hardware, software, or any combination thereof. The login screen may be displayed in any visual format that would allow the user to easily comprehend (e.g., read and parse) the listed information.

As used herein, the term "backup" is intended to be broad in scope. In this manner, example backups in connection with which embodiments of the invention may be employed include (but not limited to): full backups, partial backups, clones, snapshots, incremental backups, differential backups, etc.

As used herein, "data retention" is a period of time, with a definite start and end, within which the data should be retained in storage (e.g., 120). For example, a set of user requirements and/or technical considerations (e.g., security considerations, performance considerations, etc.) of a data center may be used to generate a data retention policy specifying that user data should be retained in the storage for seven years.

As used herein, a "workload" is a physical or logical component configured to perform certain work functions. Workloads may be instantiated and operated while consuming computing resources allocated thereto. A user may configure a data protection policy for various workload types. Examples of a workload may include (but not limited to): a data protection workload, a VM, a container, a NAS, a database, an application, a collection of microservices, a file system (FS), small workloads with lower priority workloads (e.g., FS data, operating system (OS) data, etc.), medium workloads with higher priority (e.g., VM with FS data, network data management protocol (NDMP) data, etc.), large workloads with critical priority (e.g., mission critical application data), etc.

As used herein, a "policy" is a container or other collection of information, such as a backup policy or other data protection policy, that includes, for example (but not limited to): identity of source data that is to be protected, backup schedule and retention requirements for backed up source data, identity of a service level agreement (SLA) (or a rule) that applies to source data, identity of a target device where source data is to be stored, etc.

As used herein, a "rule" is a guideline used by an SLA component to select a particular target device (or target devices), based on the ability of the target device to meet requirements imposed by the SLA. For example, a rule may specify that a hard disk drive (HDD) having a particular performance parameter should be used as the target device. A target device selected by the SLA component may be identified as part of a backup policy or other data protection policy.

As used herein, a "SLA" between, for example, a vendor and a user may specify one or more user performance requirements (that define, for example, a target device to be chosen dynamically during, and as part of, a data protection process), for example (but not limited to): how many copies should be made of source data, latency requirements, data availability requirements, recovery point objective (RPO) requirements, recovery time objective (RTO) requirements, etc. In most cases, the user may be agnostic, for example, as to which particular target devices are used, as long as the user performance requirements are satisfied.

In one or more embodiments, data protection policies used to protect massive amounts of data may require a certain level of intelligence to infer SLAs of a user and provide ease of implementing data protection by reducing manual effort as much as possible to meet user expectations (or user demands). Further, a data protection policy may be defined and implemented to determine target device(s) that are best suited to meet user SLAs (that are defined within the policy). In some cases, user SLAs may be assigned to particular data protection policies for different types of data protection workloads.

In one or more embodiments, the wrong (or sub-optimal) selection of a target device may (i) result in generating an over-utilized or under-utilized target device and (ii) unnecessarily delay a backup (or replication) operation window (discussed below).

As used herein, a "container" is an executable unit of software in which an application code is packaged, along with its libraries and dependencies, so that it can be executed anywhere. To do this, a container takes advantage of a form of OS virtualization in which features of the OS are leveraged to both isolate processes and control the portion of CPU, memory, and disk that those processes have access to.

Comparing to a VM, a container does not need to include a guest OS in every instance and may simply leverage the features and resources of a host OS. For example, instead of virtualizing the underlying hardware components, a container virtualize the OS, so the container includes only the application (and its libraries and dependencies). The absence of the guest OS makes a container lightweight, fast, and portable.

Further, comparing to a conventional data center scenario, in which (i) all the necessary hardware and software components are needed to be acquired and (ii) an entire infrastructure team is needed to build and configure all aspects of the infrastructure (which may take weeks), the above process may take only minutes with containers. Containers may also include functionality to: (i) perform disaster recovery (with this functionality, even if multiple containers fail, applications may continue to execute uninterrupted), (ii) perform seamless scaling up and down with little to no intervention on the part of a user (with this functionality, as demand grows, containers may eliminate the need to add more servers or allocate more resources in a costly way), and (iii) reduce labor-intensive efforts and costs, in which containers may require very few personnel to manage and monitor applications and instances. One of ordinary skill will appreciate that containers may perform other functionalities without departing from the scope of the invention.

As used herein, a "file system" is a method that an OS (e.g., Microsoft® Windows, Apple® MacOS, etc.) uses to control how data is named, stored, and retrieved. For example, once a user has logged into a computing device (e.g., 500, FIG. 5), the OS of that computing device uses the file system (e.g., new technology file system (NTFS), a resilient file system (ReFS), a third extended file system (ext3), etc.) of that computing device to retrieve one or more applications to start performing one or more operations (e.g., functions, tasks, activities, jobs, etc.). As yet another example, a file system may divide a volume (e.g., a logical drive) into a fixed group of bytes to generate one or more blocks of the volume.

As used herein, a "cloud" refers to servers that are accessed over the Internet (and the software and databases that execute on those servers). With the help of cloud (or "cloud computing"), users or organizations do not need to manage physical servers themselves or execute software application on their own computing devices. In most cases, a cloud enables users to access same files and/or applications from almost any computing device, because the computing and storage take place on servers, instead of locally on users' computing devices. For example, a user may log into the user's email account on a new computing device and still may find the email account in place with all email conversion history.

Cloud computing is possible because of a technology called "virtualization". Virtualization allows for the generation of a VM that behaves as if it was a physical computing device with its own hardware components. When properly implemented, VMs on the same host are sandboxed from one another so that they do not interact with each other, and the files and/or applications from one VM are not visible to another VM even though they are on the same physical computing device.

In one or more embodiments, cloud computing environments (which may or may not be public) may include storage environments that may provide data protection functionality for one or more users. Cloud computing environment may also perform computer-implemented services (e.g., data protection, data processing, etc.) on behalf of one or more users. Some example cloud computing environments in connection with which embodiments of the invention may be employed include (but not limited to): Microsoft® Azure, Amazon® AWS, Dell® Cloud Storage Services, Google® Cloud, etc. In one or more embodiments, the data protection system (110) may include a data protection module (112) and a database (114). The data protection module (112) and the database (114) may be physical or logical devices, as discussed below.

In one or more embodiments, the data protection module (112) may provide data protection (e.g., data backup, data management, data restore, etc.) services to the production host (130) (or any other component of the system (100)). The data protection services may initiate (e.g., instantiate, execute, etc.) generation and storage of backups (e.g., block-based backups, file-based backups, etc.) in the storage (120). The data protection services may also include restoration of the production host (130) (or any other component of the system (100)) to a restoration host (not shown) using the backups stored (temporarily or permanently) in the storage (120).

More specifically, the data protection module (112) may provide data protection services to the production host (130) (or any other component of the system (100)) by orchestrating (or scheduling): (i) generation of backups of the production host (130), (ii) storage of the generated backups of the production host (130) in the storage (120), (iii) consolidation of one or more backup requests to reduce (or to prevent) generation of backups that are not useful for restoration purposes, and (iv) restoration of the production host (130) to previous states using backups stored in the storage (120).

Further, to provide the aforementioned services, the data protection module (112) may include functionality to generate and issue instructions to any other component of the system (100). The data protection module (112) may also generate instructions in response to data protection requests from other entities.

In one or more embodiments, the data protection module (112) may generate such instructions in accordance with data protection schedules that specify when a protection needs to be performed. In one or more embodiments, a data protection schedule may lay out specific points in time for a protection to be performed. A data protection schedule may be configured based on a user's recovery point objective (RPO).

As used herein, a "user's RPO" is the time between a data loss event and a most recent backup. For example, if a user has a 4-hour RPO for an application, then the maximum gap between a data loss event and the most recent backup will be 4-hours. In most cases, having a 4-hour RPO may not necessarily mean that a corresponding user will lose 4 hours' worth of data. For example, consider a scenario in which a word processing application goes down at 12:35 a.m. and restored by 1:10 a.m. In this scenario, the user may not have much data to lose.

As yet another example, consider a scenario in which a security application goes down at 10:05 a.m. and could not be restored until 1:25 p.m. In this scenario, the user may lose data that is highly valuable to the user. For this reason, the user may set an RPO based on the application priority and may configure the backup schedules accordingly.

In one or more embodiments, as being a component that hosts a set of microservices (e.g., Java® microservices) that are independently designed to interact each other (e.g., a complexly built distributed computing architecture), the data protection module (112) may provide a computing environment that is configured for, at least: (i) workload placement collaboration, (ii) computing resource (e.g., processing, storage/memory, virtualization, networking, etc.) exchange, and (iii) powering applications of any size and scale.

In one or more embodiments, the data protection module (112) may be directed to hosting and maintaining various workloads. For example, the data protection module (112) (more specifically, the microservices (e.g., a payroll microservice, an authentication microservice, etc.)) may split up a request (e.g., an operation, a task, an activity, etc.), coordinating their efforts to complete the request (e.g., to generate a response) more efficiently than if a single microservice had been responsible for completing the request.

As built on a set of microservices (discussed below), the distributed computing architecture may offer various advantages (e.g., features, characteristics, etc.) over conventional computing environments (e.g., monolithic computing environments), for example (but not limited to): a reduced risk of a single process failure (e.g., availability of an application may be in risk because many dependent and tightly coupled processes may increase the impact of a single process failure), an improved reliability while completing a request, a higher processing-related fault tolerance, an ability to complete a request in a shorter period of time, scalability over time, heterogeneity, concurrency, transparency, etc. For example, an ability to scale as the size of a workload increases is an essential characteristic of the architecture, achieved by adding additional microservices to the data protection module (112) as needed.

As yet another example, with the help of the fault tolerance characteristic of the architecture, if one of the microservices fails, an administrator (or a user) of the data protection module (112) may bypass the failed microservice and assign the task of that microservice to another available microservice. In this manner, the remaining microservices may continue to operate without disrupting an overall computation. As yet another example, with the help of the transparency characteristic of the architecture, a user of the clients (150) (who is interacting with the data protection module (112)) may perceive the architecture as a single computational environment, allowing the user to interact with a single logical device rather than being concerned with the architecture's infrastructure. The aforementioned examples are not intended to limit the scope of the invention.

In one or more embodiments, the distributed computing architecture may be based on different types of microservices, for example (but not limited to): a business microservice, a core microservice, an infrastructure microservice (e.g., a database microservice, an authentication microservice, etc.), etc. A business microservice may be configured to protect, for example (but not limited to): a VM, a database application, a container, components of a file system, etc. As being a policy or a workflow management microservice, a core microservice may be configured to orchestrate an operation(s) of the business microservice. Further, an infrastructure microservice may be configured to check whether, for example (but not limited to): a core microservice is performing its tasks, a business microservice is performing its tasks, a user is an authenticated user to use a service provided by the data protection module (112), etc. In one or more embodiments, the above-discussed microservices may be configured to perform a data protection operation and in order to perform that operation, a request (e.g., a data protection request) that is received from a user of the clients (150) may travel through multiple layers of the data protection module (112).

For example, consider a scenario in which a user of the clients (150) configures a service level agreement (SLA) to protect (e.g., to backup, to restore, to manage, etc.) one or more applications executing on a database (e.g., Oracle® database, SAP® Hana database, etc.). The user then sends a data protection request to the data protection module (112) in order to protect application data of those applications. In this scenario, the data protection module (112) may transfer the received request to a core microservice. After receiving the request, the core microservice may communicate (using, for example, REST APIs) with an authentication microservice to verify whether the user is an authenticated user. The authentication microservice may then notify (using, for example, REST APIs) the core microservice indicating that the user is an authenticated user and provide a token to the core microservice.

Upon receiving the token, the core microservice may initiate protection of the database (and its application data) (simply the "database"). In this manner, the core microservice may first check (and verify) the SLA configured by the user and determine which database needs to be protected. The core microservice may then generate a "database backup job" and dispatches the job to a business microservice. Upon receiving the job, the business microservice may orchestrate the protection of the database by communicating with the production host (130). Thereafter, the production host (130) may start backing up the database to a target device (e.g., a data domain, the storage (120), cloud storage, etc.). While backing up, the business microservice may obtain a status (e.g., currently active, completed, etc.) of the backup operation (e.g., 55% of the backup operation is completed, 100% of the backup operation is completed, etc.) from the target device (discussed below). In this manner, a complex job (like the database backup job) may be completed in a matter of minutes as opposed to completing the job in days because of limited computing power of a single microservice. The aforementioned example is not intended to limit the scope of the invention.

In one or more embodiments, while performing one or more operations requested by a user (or an administrator) of the clients (150), a microservice may include functionality to request and use resources (e.g., data, computing resources, etc.) available in the data protection system (110). The microservices may perform other functionalities not listed above without departing from the scope of the invention. Additional details about the resources (e.g., processing resources, networking resources, etc.) are described below. In one or more embodiments, the administrator may be a user with permission to make changes on the clients (150) that will affect other users of the clients (150).

In one or more embodiments, in order to provide the above-mentioned functionalities, microservices may need to communicate with one another with minimum amount of latency (e.g., with high-throughput (e.g., a high data transfer rate) and sub-millisecond latency). For this reason, in most cases, REST APIs may be used to enable communication between microservices. As used herein, a "REST API" is an interface that two computing devices use to exchange data securely over the Internet (or to exchange data internally). More specifically, the term "REST" defines a set of rules and constraints (not a protocol or a standard) that need to be followed when building the microservices. Any microservice that adheres to those rules and constraints will be able to communicate via a set of uniform, shared, and stateless (or stateful) operators and requests. APIs denote the underlying code that, if it conforms to the set of rules and constraints, allows microservices to communicate with one another.

As used herein, "communication" may refer to simple data passing, or may refer to two or more microservices coordinating a job.

As used herein, an "API" represents a collection of methods and procedures (e.g., retrieving information about an API source, updating the API source, etc.) that define how applications or computing devices can connect to and communicate with each other. The collection of methods and procedures may be designed and configured to facilitate a microservice's connection (e.g., access) to one another. In general, the microservice performing the accessing is called "the client", and the microservice containing a resource is called "the server".

In operation, REST APIs use Hypertext Transfer Protocol (HTTP) to communicate. More specifically, REST APIs communicate via HTTP to perform standard database functions such as, for example, creating, reading, updating, and deleting records within a resource. For example, a well-designed REST API is similar to a webpage executing on a web browser with built-in HTTP functionality.

As used herein, "HTTP" is a request/response protocol that is used in cases in which a synchronous request/response is required. This means that microservices making requests via REST APIs must be designed to expect an immediate response. If the client receiving the response is down, the sending service may be blocked while it awaits for the response. To prevent this, failover and error handling logic may be applied to (or built into) both applications.

In one or more embodiments, the data protection module (112) may include a distributed request tracing (also referred to herein as "distributed tracing") feature that helps to track microservices that are commonly deployed to the data protection module (112). Distributed tracing is a form of distributed computing to track operations of the microservices executing on the data protection module (112).

Mostly in software development and IT operations, administrators employ distributed tracing to track the course of a request (or a transaction) as it travels through a microservice that is being tracked. For example, by employing distributed tracing, an online credit card transaction (as it paves its way from a customer's initial purchase to the verification and approval process to the completion of the transaction) may be tracked. In this manner, administrators may track a request (and its corresponding response) step by step to pinpoint bottlenecks, bugs, and other issues that may impact a microservice's performance. The aforementioned example is not intended to limit the scope of the invention.

Tracing is a fundamental process employed by administrators (along with other forms of logging) to gather data about a microservice's behavior; however, a conventional tracing may generate problems when it is used to troubleshoot microservices hosted by the data protection module (112). In most cases, because microservices scale independently, it is possible to generate a complex path through which a request must travel. Without executing distributed tracing, tracking multiple microservices executing on a complexly built distributed computing environment may be impossible.

Further, in order to handle the considerable complexity of distributed computing environments, execution of distributed tracing may be necessary because: (i) it may track multiple microservices and their corresponding operations simultaneously across the data protection module (112), (ii) it may track requests through each microservice, and (iii) it may provide an end-to-end narrative account of each request. In this manner, administrators of the data protection module (112) may (i) track each iteration of a function, which enables them to conduct performance tracking by observing which instance of that function is causing the microservice to slow down and (ii) ascertain how a request travels through multiple microservices (e.g., one microservice to the next), particularly when the administrators do not have enough insight into an implementation of the microservices that are utilized.

In one or more embodiments, microservices are an architectural and organizational approach to software (e.g., an application) development approach where software is composed of many loosely coupled, network-connected, and independently deployable smaller services that communicate over well-defined APIs. This approach may allow a large application to be divided into smaller independent parts (with each part having its own responsibility), and may provide a framework to develop, deploy, and maintain microservices independently (to support a decentralized software development effort).

Further, in this approach: (i) each microservice may have its own (e.g., allocated) technology stack (e.g., memory, CPU, data management model, etc.), (ii) each microservice may communicate with one another over a combination of REST APIs, message brokers, and/or event streaming, (iii) a combination of microservices make applications easier to scale and faster to develop, (iv) each microservice may be updated, deployed, and scaled to meet demand for specific functions of an application, (v) each microservice may be designed to perform a set of tasks without affecting the functioning of other microservices and without sharing any of its implementation with other microservices, (vi) each microservice may be tailored to handle a specific task without following a "one-size-fits-all" method, and (vii) the independence of microservices increases an application's resistance to failure (where the application may handle a service failure by degrading functionality and not crashing the entire application). Comparing to a monolithic approach, microservices compose a single application from many smaller, loosely coupled services as opposed to the monolithic approach of a large, tightly coupled application (which executes as a single service). For example, if a process of an application experiences a spike in demand, an entire monolithic architecture may need to be scaled. As yet another example, in a monolithic architecture, if a single component fails, that component may cause the related application to fail.

As yet another example, to serve a single request, a microservices-based application may call on many other (internal) microservices to compose its response. In most cases, containers (as a well-suited microservices architecture) are preferred because they allow a user to develop services without worrying about the dependencies. The distributed computing architecture may be used for, for example (but not limited to): data protection, website migration, media (e.g., images, videos, etc.) content storage, payment processing and ordering, data processing, etc.

In one or more embodiments, similar to the communication between the clients (150) and the production host (130), the clients (150) may also send a request (e.g., a data protection request) to the data protection module (112), and in return, the clients (150) may receive a response (e.g., a response that specifies completion of a database backup in storage) from the data protection module (112). One of ordinary skill will appreciate that the data protection module (112) may perform other functionalities without departing from the scope of the invention.

Figure 5:
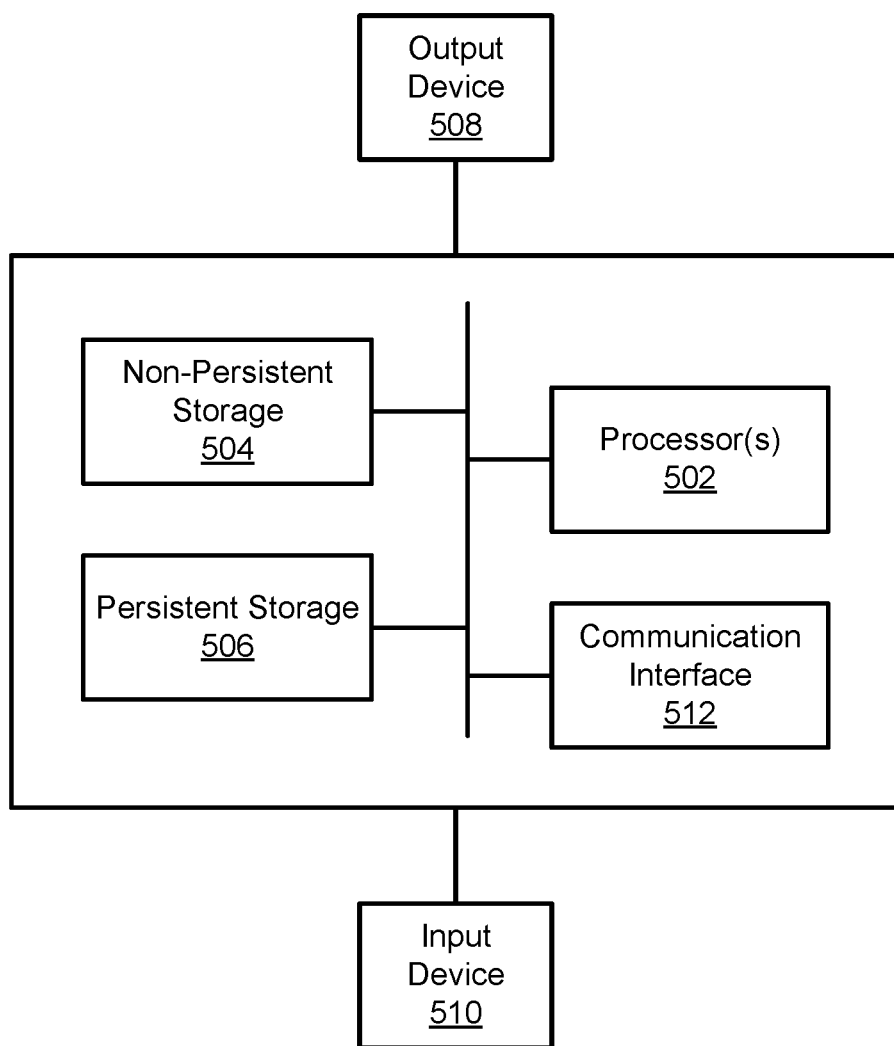
FIG. 5 shows a diagram of a computing device in accordance with one or more embodiments of the invention.

In one or more embodiments, the data protection module (112) may be implemented as a computing device (e.g., 500, FIG. 5). The computing device may be, for example, a mobile phone, a tablet computer, a laptop computer, a desktop computer, a server, a distributed computing system, or a cloud resource. The computing device may include one or more processors, memory (e.g., random access memory (RAM)), and persistent storage (e.g., disk drives, solid-state drives (SSDs), etc.). The computing device may include instructions, stored in the persistent storage, that when executed by the processor(s) of the computing device cause the computing device to perform the functionality of the data protection module (112) described throughout the application.

Alternatively, in one or more embodiments, the data protection module (112) may be implemented as a logical device. The logical device may utilize the computing resources of any number of computing devices to provide the functionality of the data protection module (112) described throughout the application.

In one or more embodiments, the database (114) may be a fully managed cloud database (or any logical container) that acts as a shared storage or memory (simply storage/memory) resource (discussed below) that is functional to store unstructured and/or structured data. Further, the database (114) may also occupy a portion of a physical storage/memory device or, alternatively, may span across multiple physical storage/memory devices.

In one or more embodiments, the database (114) may store unstructured and/or structured data that may include, for example (but not limited to): an index of an asset (e.g., a file, a folder, etc.), a backup history documentation of a workload, a restore history documentation of a workload, a documentation that indicates a set of jobs (e.g., a data backup job, a data restore job, etc.) that has been generated, a documentation that indicates a status of a job (e.g., how many jobs are still active, how many jobs are completed, etc.), a set of SLAs (e.g., an agreement that indicates a period of time required to retain backup data), recently obtained user information (e.g., records, credentials, etc.), a cumulative history of initiated data backup operations (e.g., sessions) over a prolonged period of time, a cumulative history of initiated data restore operations over a prolonged period of time, etc.

In one or more embodiments, the unstructured and/or structured data may be updated (automatically) by third party systems (e.g., platforms, marketplaces, etc.) (provided by vendors) or by administrators based on, for example, newer (e.g., updated) versions of SLAs being available. The unstructured and/or structured data may also be updated when, for example (but not limited to): a data backup operation is initiated, a set of jobs is received, a data restore operation is initiated, an ongoing data backup operation is fully completed, etc.

In one or more embodiments, similar to the communication between the clients (150) and the production host (130), the clients (150) may also send a request to the database (114), and in return, the clients (150) may receive a response (e.g., a documentation that indicates a status of a recently initiated data backup job) from an agent (not shown) of the database (114). One of ordinary skill will appreciate that the database (114) may perform other functionalities without departing from the scope of the invention.

In one or more embodiments, the database (114) may provide an indexing service. More specifically, the agent of the database (114) may receive various data protection related inputs directly from the data protection module (112) (or indirectly from the clients (150)). Upon receiving, the agent may analyze those inputs to generate an index(es) (e.g., a data backup operation index(es)) for optimizing the performance of the database (114) by reducing a required amount of database access(es) when implementing a request (e.g., a data retrieval request). In this manner, requested data may be quickly located and accessed from the database (114) using an index of the requested data. In one or more embodiments, an index may refer to a database structure that is defined by one or more field expressions. A field expression may be a single field name such as "user_number". For example, an index (e.g., E41295) may be associated with "user_name" (e.g., Adam Smith) and "user_number" (e.g., 012345), in which the requested data is "Adam Smith 012345".

Further, in one or more embodiments, an index may include, for example (but not limited to): information about a user associated with a data protection operation (e.g., a data backup operation, a data recovery operation, etc.), a keyword extracted from a data recovery operation that relates to a type of the recovery (e.g., cloud disaster recovery, rapid recovery, etc.), a tag associated with a data protection operation (e.g., a permanent and self-service data backup from a VM), etc. The index(es) may also include other information that may be used to efficiently identify historical data protection operations. In one or more embodiments, the aforementioned data may be stored as "data protection operation metadata" in the database (114), in which the corresponding data may be backed up in the storage (120) (temporarily or permanently), or may be restored in a recovery host.

In one or more embodiments, for example, consider a scenario in which the data protection module (112) obtains file system metadata (e.g., an identifier of an asset, an identifier of a parent folder containing an asset, an attribute of an asset, an access control list (ACL) of an asset, etc.) from the storage (120). In this scenario, the data protection module (112) analyzes the file system metadata and employs the indexing service of the database (114) to generate an index for each asset of the file system. More specifically, as a result of the analysis, the data protection module (112) provides one or more components (e.g., an identifier of an asset, an attribute of an asset, etc.) of the file system metadata to the indexing service. The indexing service may then generate an index for each asset using the components.

Thereafter, the indexing service may reorder the index of each asset to reflect a file system hierarchy of the file system (because, for example, without reordering the index of each asset, the index of each asset may not accurately reflect the file system hierarchy). The data protection module (112) may then display, via the GUI, the reordered index to a user of the data protection module (112). In one or more embodiments, the reordered index may also specify an access level of each asset. For example, if the reordered index shows that Folder B contains Folder D (e.g., Folder B is a parent folder of Folder D), an access level of Folder B may be four and an access level of Folder D may be five. The indexing service may store (temporarily or permanently) the reordered index in the database (114).

In one or more embodiments, the database (114) may be implemented as a computing device (e.g., 500, FIG. 5). The computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device cause the computing device to perform the functionality of the database (114) described throughout the application.

Alternatively, in one or more embodiments, similar to the data protection module (112), the database (114) may also be implemented as a logical device.

In one or more embodiments, the storage (120) may include functionality to provide: (i) temporary and/or permanent data storage services (e.g., the storage (120) may store backups of the production host (130)) and (ii) copies of previously stored data (e.g., the storage (120) may provide copies of previously stored backups of the production host (130)). Said another way, the storage (120) may be configured to generate and store backups in itself. The storage (120) may also be configured to restore data using the backups.

Further, one or more snapshots (e.g., user-generated snapshots) may be stored and/or retrieved from the storage (120). In one or more embodiments, for example, snapshots may refer to point-in-time copies of user data. For example, Snapshot A may include one or more database objects (discussed below) of user data at a specific point-in-time. As yet another example, Snapshot B may include one or more database objects of the user data at a later point-in-time than the specific point-in-time captured by Snapshot A. One of ordinary skill will appreciate that the storage (120) may perform other functionalities without departing from the scope of the invention.

In one or more embodiments, the data protection module (112) may obtain a status of a data protection operation from the storage (120). The status of the operation may specify information such as: (i) whether the operation was successful and whether the operation was completed within a predetermined window (e.g., 100% of the operation was completed within the predetermined window), or (ii) whether the operation was unsuccessful and how much of the operation was not completed within the predetermined window (e.g., 70% of the operation was completed and 30% of the operation was not completed). In one or more embodiments, the predetermined window may be a period of time, with a definite start and end, within which a data protection operation is set to be completed.

In one or more embodiments, the storage (120) may include an operation monitoring service for monitoring a status of a data protection operation. The operation monitoring service may be a computer program that is executed on the underlying hardware of the storage (120). The operation monitoring service may also be designed and configured to facilitate remote access to check the status of and/or manipulate locally stored data during an operation. Further, the operation monitoring service may include functionality to control remote procedure calls (e.g., API calls) that aims to access and manipulate any granularity of the locally stored data during an operation.

As used herein, an "API call" refers to a process of an application or a computing device submitting a request to an API to retrieve the requested data from an external application or an external computing device.

In one or more embodiments, when an ongoing data protection operation is completed, the storage (120) may send a notification (e.g., a confirmation notification) to the data protection module (112) (particularly, for example, to a business microservice) regarding the completed operation. In one or more embodiments, the notification (e.g., the alert) may indicate whether the operation was completed within the predetermined window, or whether the operation was completed after exceeding the predetermined window. The notification may be displayed on the GUI of the data protection module (112). Thereafter, the data protection module (112) may notify, via a GUI of a client, a requesting entity (e.g., a user who requested the operation) about completion of the operation.

In one or more embodiments, as being a target device (or a data domain), the storage (120) may include various types of data, for example (but not limited to): an attribute of an asset, an ACL of an asset, application data, user data, an SLA, a snapshot of a volume, a list of instructions, a setting of an application, a version of an application, a version of an OS, display resolution of a client, a product identifier of an application, an alert (e.g., a predictive alert, a proactive alert, a technical alert, etc.) triggered in a client, an important keyword (e.g., recommended maximum CPU operating temperature is 75° C.) related to a hardware component, an amount of storage used by an application, a language setting of an OS, a serial number of a client, a hardware ID number of a hardware component, an identifier of a client's manufacturer, a product identifier of a hardware component, media access control (MAC) information of a client, network connectivity information (e.g., a category of a network) of a client, an identifier of a client, a type of a client, a type of a file system, information related to a customer's CPU usage, a recovery catalog, an asset, a control asset, an archive log asset, etc.

In one or more embodiments, a recovery catalog may be a database object that stores metadata of a backup operation (simply "backup metadata"). The recovery catalog may include entries for one or more backup operations. The entries may include backup metadata that specify information regarding successfully backed up assets from previously executed backup operations. For example, backup metadata may include (but not limited to): an identifier of an asset, information associated with a location of an asset, etc.

In one or more embodiments, an asset may be a database object that stores database data, in which it may include computer-readable content (e.g., text, image, video, audio, machine code, any other form of, or a combination thereof) that may be generated, interpreted, and/or processed by an application.

In one or more embodiments, an asset may store database data in an undeduplicated form or in a deduplicated form. Briefly, a deduplicated form of database data may be generated, via the application, by performing data deduplication on an undeduplicated form of the database data. That is, undeduplicated database data may include a computer-readable content that may or may not entail redundant information. In contrast, deduplicated database data may result from the elimination of any redundant information analyzed throughout an undeduplicated computer-readable content.

In one or more embodiments, deduplicated database data may reflect a content recipe of one or more undeduplicated computer-readable contents. A content recipe may be a sequence of chunk identifiers (or pointers) of unique database data chunks consolidated in the storage (120). The sequence of chunk identifiers (as a representative of the deduplicated database data) may be used to reconstruct the corresponding undeduplicated database data. Additionally, a given chunk identifier for a given database data chunk may include a cryptographic fingerprint (or hash) of the given database data chunk.

In one or more embodiments, a control asset may be a database object that stores database metadata, in which the database metadata may include information descriptive of the database's status and structure. For example, database metadata may include (but not limited to): an identifier of a database, an identifier of an asset, information specifying a storage location of an asset, a creation timestamp of an asset, a log sequence number of an archive log file, etc.

In one or more embodiments, an archive log asset may be a database object that stores history of changes made to database data. An archive log asset may include one or more redo entries (or redo records), which may include a set of change vectors. Each change vector may describe (or represent) a modification made to a subset of database data. In one or more embodiments, an archive log asset may serve to recover database data should a failover occur, or to implement recent changes to recovered database data that was recovered during a backup operation.

In one or more embodiments, an alert may specify, for example (but not limited to): a medium-level of CPU overheating is detected, a recommended maximum CPU operating temperature is exceeded, etc. In one or more embodiments, alerts may be defined by a vendor of that client, by the administrator, by another entity, or any combination thereof. The alerts may be defined based on a data protection policy.

In one or more embodiments, important keywords may be defined by a vendor of that client, by the administrator, by another entity, or any combination thereof. The important keywords may be specific technical terms or vendor specific terms that are used in system log files.

In one or more embodiments, the storage (120) may include one or more storage or memory resources. A storage or memory resource may refer to a measurable quantity of a storage/memory-relevant resource type, which can be requested, allocated, and consumed. A storage/memory-relevant resource type may encompass a physical device (i.e., hardware), a logical intelligence (i.e., software), or a combination thereof, which may provide temporary or permanent data storage functionality and/or services. Examples of a storage/memory-relevant resource type may be (but not limited to): a hard disk drive (HDD), an SSD, RAM, Flash memory, a tape drive, a fibre-channel (FC) based storage device, a floppy disk, a diskette, a compact disc (CD), a digital versatile disc (DVD), a non-volatile memory express (NVMe) device, a NVMe over Fabrics (NVMe-oF) device, resistive RAM (ReRAM), persistent memory (PMEM), virtualized storage, virtualized memory, etc.

In one or more embodiments, the production host (130) may host any number of applications (and/or content accessible through the applications) that provide application services to the clients (150). Application services may include, for example (but not limited to): database services, electronic communication services, instant messaging services, file storage services, web-based services, desktop-based services, workload placement collaboration services, serving (e.g., processing) a request, sharing an application log, receiving computing resource details of a node, transmitting a request, analyzing data, streaming video, etc. In order to provide application services, each application may host similar or different components. The components may be, for example (but not limited to): instances of databases, instances of email servers, etc.

Further, applications may vary in different embodiments, but in certain embodiments, applications may be custom developed or commercial (e.g., off-the-shelf) applications that a user desires to execute in the production host (130). In one or more embodiments, applications may be logical entities executed using computing resources of the production host (130). For example, applications may be implemented as computer instructions, e.g., computer code, stored on persistent storage of the production host (130) that when executed by the processor(s) of the production host (130) cause the production host (130) to provide the functionality of the applications described throughout the application.

In one or more embodiments, while performing, for example, one or more operations requested by a user of the clients (150), applications installed on the production host (130) may include functionality to request and use resources (e.g., data, computing resources, etc.) of the production host (130). The applications may perform other types of functionalities not listed above without departing from the scope of the invention. In one or more embodiments, while providing application services to a user, applications may store (temporarily or permanently) data that may be relevant to the user in the persistent storage or in the storage (120).

In one or more embodiments, the production host (130) may provide computer-implemented services to the clients (150) (and/or other components of the system (100)). The production host (130) may provide any quantity and any type of computer-implemented services (e.g., data storage services, electronic communication services, etc.). To provide computer-implemented services, the production host (130) may include a collection of physical components (e.g., processing resources, storage/memory resources, networking resources, etc.) configured to perform operations of the production host (130) and/or otherwise execute a collection of logical components (e.g., virtualization resources) of the production host (124). A portion of the collection of physical and logical components are described below.

In one or more embodiments, the production host (130) may include any number of VMs that hosts the above-discussed applications. The VMs may be logical entities executed using the physical and logical components of the production host (130), or using computing resources of other computing devices connected to the production host (130). Each of the VMs may perform similar or different processes. In one or more embodiments, the VMs (and applications hosted by the VMs) may generate data (e.g., VM data) that is stored in the persistent storage of the production host (130), in which the VM data may reflect a state of a VM.

In one or more embodiments, VMs may provide services (e.g., application services) to the clients (150). For example, VMs may host instances of databases, email servers, and/or other applications that are accessible to the clients (150). The VMs may host other types of components not listed above without departing from the scope of the invention.

In one or more of embodiments, VMs may be implemented as computer instructions, e.g., computer code, stored in the persistent storage that when executed by the processor(s) of the production host (130) cause the production host (130) to provide the functionality of the VMs described throughout the application.

In one or more embodiments, the production host (130) may include a hypervisor. The hypervisor may be configured to orchestrate the operation of the VMs by allocating the physical and logical components to each of the VMs. In one or more embodiments, the hypervisor may be a physical device including circuitry, for example (but not limited to): a field-programmable gate array, an application-specific integrated circuit, a programmable processor, a microcontroller, a digital signal processor, etc. The physical device may be adapted to provide the functionality of the hypervisor described throughout the application. Alternatively, similar to the VMs, the hypervisor may also be implemented as computer instructions.

In one or more embodiments, the production host (130) may also include a production agent, which is configured to locally orchestrate the performance of data protection operations. For example, the production agent may perform a data protection operation under the direction of the data protection module (112), in which the data protection module (112) sends instructions to the production agent regarding: (i) when one or more operations should be performed, (ii) where the resulting data backup(s) should be stored (temporarily or permanently), and (iii) when a VM should be restored to a previous state. Other instructions not listed above may also be sent without departing from the scope of the invention.

In one or more embodiments, to orchestrate the performance of one or more data operations, the production agent may issue commands to the hypervisor to manage one or more VMs when a backup of those VMs is being performed, or when a restoration of those VMs is being performed.

In one or more embodiments, the production agent may include functionality to: (i) consolidate multiple data protection requests (received from, for example the data protection module (112)) so that duplicative operations (which may not be useful for restoration purposes) are not generated, and (ii) initiate multiple data protection operations in parallel. For example, the production agent may host multiple operations. Each of the multiple operations may (a) manage the initiation of a respective operation and (b) operate concurrently to initiate multiple operations. In one or more embodiments, the production agent may be implemented using hardware, software, or any combination thereof.

In one or more embodiments, the production host (130) may be implemented as a computing device (e.g., 500, FIG. 5). The computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device cause the computing device to perform the functionality of the production host (130) described throughout the application.

Alternatively, in one or more embodiments, similar to the data protection module (112), the production host (130) may also be implemented as a logical device.

In one or more embodiments, the clients (150) may be physical or logical computing devices configured for hosting one or more workloads, or for providing a computing environment whereon workloads may be implemented. Further, the clients (150) may correspond to computing devices that a user is using to interact with one or more components of the system (100).

In one or more embodiments, a client may include any number of applications (and/or content accessible through the applications) that provide computer-implemented application services to a user. Applications may be designed and configured to perform one or more functions instantiated by a user of the clients (150). Examples of an application may include (but not limited to): a word processor, a media player, a web browser, a file viewer, an image editor, etc.

In order to provide the above-mentioned application services, each application may host similar or different components. The components may be, for example (but not limited to): instances of databases, instances of email servers, etc. Applications may be executed on one or more clients as instances of the application.

In one or more embodiments, applications may vary in different embodiments, but in certain embodiments, applications may be custom developed or commercial applications that a user desires to execute in a client. In one or more embodiments, applications may be logical entities executed using computing resources of a client. For example, applications may be implemented as computer instructions, e.g., computer code, stored on persistent storage of the client that when executed by the processor(s) of the client cause the client to provide the functionality of the applications described throughout the application.

In one or more embodiments, while performing, for example, one or more operations requested by a user, applications installed on a client may include functionality to request and use physical and logical components of the client. Applications may also include functionality to use data stored in storage/memory resources of the client. The applications may perform other types of functionalities not listed above without departing from the scope of the invention. In one or more embodiments, while providing application services to a user, applications may store data that may be relevant to the user in storage/memory resources of a client.

In one or more embodiments, the clients (150) may interact with the production host (130). For example, the clients (150) may issue requests to the production host (130) to receive responses and interact with various components of the production host (130). The clients (150) may also request data from and/or send data to the production host (130). As yet another example, the clients (150) may utilize application services provided by the production host (130). When the clients (150) interact with the production host (130), data that is relevant to the clients (150) may be stored (temporarily or permanently) in the production hosts (130).

As yet another example, consider a scenario in which the production host (130) hosts a database utilized by the clients (150). In this scenario, the database may be a client database associated with users of the clients (150). When a new user is identified, the clients (150) may add information of the new user to the client database. By doing so, data that is relevant to the clients (150) may be stored in the production host (130). This may be done because the clients (150) may desire access to the information of the new user at some point-in-time.

As yet another example, a client may execute an application that interacts with an application database hosted by the production host (130). When an application upgrade is available to fix a critical software issue, the production host (130) may identify the client that requires the application upgrade. The application database may then provide the application upgrade to the client. By doing so, the application executed by the client may be kept up-to-date. As yet another example, the clients (150) may send instructions to the production host (130) to configure one or more VMs hosted by the production host (130). In one or more embodiments, instructions may be, for example (but not limited to): instructions to configure a backup policy, instructions to take a snapshot of VM data, etc.

As yet another example, a client may initiate an application to execute on the production host (130) such that the application may (itself) gather, transmit, and/or otherwise manipulate data located in the production host (130), remote to the client. In one or more embodiments, the clients (150) may share access to more than one production host and may similarly share any data located in those hosts.

In one or more embodiments, the clients (150) may provide computer-implemented services to users (and/or other computing devices such as, for example, other clients or other types of components). The clients (150) may provide any quantity and any type of computer-implemented services (e.g., data storage services, electronic communication services, etc.). To provide computer-implemented services, each client may include a collection of physical components (described below) configured to perform operations of the client and/or otherwise execute a collection of logical components (described below) of the client.

In one or more embodiments, a processing resource (not shown) may refer to a measurable quantity of a processing-relevant resource type, which can be requested, allocated, and consumed. A processing-relevant resource type may encompass a physical device, a logical intelligence, or a combination thereof, which may provide processing or computing functionality and/or services. Examples of a processing-relevant resource type may include (but not limited to): a CPU, a graphical processing unit (GPU), a data processing unit (DPU), a computation acceleration resource, application specific integrated circuits (ASICs), a digital signal processor for facilitating high speed communication, etc.

In one or more embodiments, a client may include a memory management unit (MMU) (not shown), in which the MMU is configured to translate virtual addresses (e.g., those of a virtual address space (discussed below)) into physical addresses (e.g., those of memory). In one or more embodiments, the MMU may be operatively connected to the storage/memory resources, and the MMU may be the sole path to access the memory, as all data destined for the memory must first traverse the MMU prior to accessing the memory. Further, the MMU may be configured to: (i) provide memory protection (e.g., allowing only certain applications to access memory) and (ii) provide cache control and bus arbitration.

In one or more embodiments, while the clients (150) provide computer-implemented services to users, the clients (150) may store data that may be relevant to the users to the storage/memory resources. When the user-relevant data is stored (temporarily or permanently), the user-relevant data may be subjected to loss, inaccessibility, or other undesirable characteristics based on the operation of the storage/memory resources.

To mitigate, limit, and/or prevent such undesirable characteristics, users of the clients (150) may enter into agreements (e.g., SLAs) with providers (e.g., vendors) of the storage/memory resources. These agreements may limit the potential exposure of user-relevant data to undesirable characteristics. These agreements may, for example, require duplication of the user-relevant data to other locations so that if the storage/memory resources fail, another copy (or other data structure usable to recover the data on the storage/memory resources) of the user-relevant data may be obtained. These agreements may specify other types of activities to be performed with respect to the storage/memory resources without departing from the invention.

In one or more embodiments, a networking resource (not shown) may refer to a measurable quantity of a networking-relevant resource type, which can be requested, allocated, and consumed. A networking-relevant resource type may encompass a physical device, a logical intelligence, or a combination thereof, which may provide network connectivity functionality and/or services. Examples of a networking-relevant resource type may include (but not limited to): a network interface card, a network adapter, a network processor, etc.

In one or more embodiments, a networking resource may provide capabilities to interface a client with external entities (e.g., other clients, the data protection system (110), etc.) and to allow for the transmission and receipt of data with those entities. A networking resource may communicate via any suitable form of wired interface (e.g., Ethernet, fiber optic, serial communication etc.) and/or wireless interface, and may utilize one or more protocols (e.g., transmission control protocol (TCP), user datagram protocol (UDP), Remote Direct Memory Access, IEEE 801.11, etc.) for the transmission and receipt of data.

In one or more embodiments, a networking resource may implement and/or support the above-mentioned protocols to enable the communication between the client and the external entities. For example, a networking resource may enable the client to be operatively connected, via Ethernet, using a TCP protocol to form a "network fabric", and may enable the communication of data between the client and the external entities. In one or more embodiments, each client may be given a unique identifier (e.g., an Internet Protocol (IP) address) to be used when utilizing the above-mentioned protocols.

Further, a networking resource, when using a certain protocol or a variant thereof, may support streamlined access to storage/memory media of other clients. For example, when utilizing remote direct memory access (RDMA) to access data on another client, it may not be necessary to interact with the logical components of that client. Rather, when using RDMA, it may be possible for the networking resource to interact with the physical components of that client to retrieve and/or transmit data, thereby avoiding any higher-level processing by the logical components executing on that client.

In one or more embodiments, a virtualization resource (not shown) may refer to a measurable quantity of a virtualization-relevant resource type (e.g., a virtual hardware component), which can be requested, allocated, and consumed, as a replacement for a physical hardware component. A virtualization-relevant resource type may encompass a physical device, a logical intelligence, or a combination thereof, which may provide computing abstraction functionality and/or services. Examples of a virtualization-relevant resource type may include (but not limited to): a virtual server, a VM, a container, a virtual CPU, a virtual storage pool, etc.

In one or more embodiments, a virtualization resource may include a hypervisor, in which the hypervisor may be configured to orchestrate an operation of, for example, a VM by allocating computing resources of a client to the VM. Details of the hypervisor are described above.

In one or more embodiments, the clients (150) may be implemented as computing devices (e.g., 500, FIG. 5). A computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device cause the computing device to perform the functionality of the clients (150) described throughout the application.

Alternatively, in one or more embodiments, similar to the data protection module (112), the clients (150) may also be implemented as logical devices.

In one or more embodiments, users may interact with (or operate) the clients (150) in order to perform work-related tasks (e.g., production workloads). In one or more embodiments, the accessibility of users to the clients (150) may depend on a regulation set by an administrator of the clients (150). To this end, each user may have a personalized user account that may, for example, grant access to certain data, applications, and computing resources of the clients (150). This may be realized by implementing the "virtualization" technology (discussed above).

In one or more embodiments, for example, a user may be automatically directed to a login screen of a client when the user connected to that client. Once the login screen of the client is displayed, the user may enter credentials (e.g., username, password, etc.) of the user on the login screen. The login screen may be a GUI generated by a visualization module (not shown) of the client. In one or more embodiments, the visualization module may be implemented in hardware (e.g., circuitry), software, or any combination thereof.

In one or more embodiments, as being a physical computing device or a logical computing device (e.g., a VM), the observation server (140) may be configured for, at least: (i) hosting and maintaining various workloads and (ii) providing a computing environment (e.g., computing power and storage) whereon workloads may be implemented.

One of ordinary skill will appreciate that the observation server (140) may perform other functionalities without departing from the scope of the invention. Examples of the observation server (140) may include (but not limited to): an enterprise server, a modular server, a blade server, a mainframe, a workstation computer, etc. In one or more embodiments, the observation server (140) may be a heterogeneous set, including different types of hardware components and/or different types of OSs. In one or more embodiments, the observation server (140) may be configured to perform all, or a portion, of the functionalities described in FIGS. 3.1 and 3.2. Additional details about the observation server are described below in reference to FIG. 2.

As used herein, a "server" may provide computer-implemented services (e.g., receiving a request, sending a response to the request, etc.) to one or more entities (e.g., users, components of the system (100), etc.). In one or more embodiments, the request may be, for example (but not limited to): a web browser search request, a REST request, a computing request, a database management request, etc. To provide the computer-implemented services to the entities, the server may perform computations locally and/or remotely. By doing so, the server may utilize different computing devices (e.g., 500, FIG. 5) that have different quantities of computing resources (e.g., processing cycles, memory, storage, etc.) to provide a consistent experience to the entities.

Figure 2:
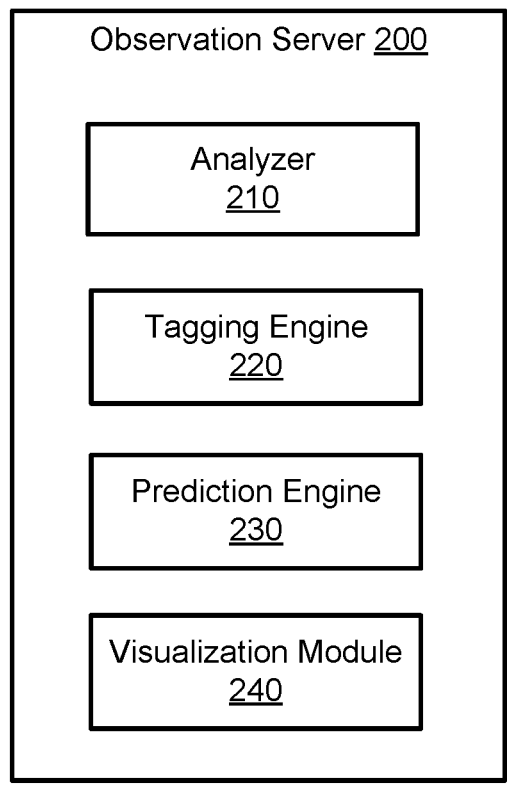
FIG. 2 shows a diagram of an observation server in accordance with one or more embodiments of the invention.

Turning now to FIG. 2, FIG. 2 shows a diagram of an observation server (200) in accordance with one or more embodiments of the invention. The observation server (200) may be an example of the observation server discussed above in reference to FIG. 1. The observation server (200) may include an analyzer (210), a tagging engine (220), a prediction engine (230), and a visualization module (240). The observation server (200) may include additional, fewer, and/or different components without departing from the scope of the invention. Each component may be operably connected to any of the other component via any combination of wired and/or wireless connections. Each component illustrated in FIG. 2 is discussed below.

In one or more embodiments, the analyzer (210) may include functionality to: (i) obtain and track information (e.g., computing resource utilization data (or key performance metrics) of microservices) regarding the microservices of the data protection module (e.g., 112, FIG. 1), (ii) based on (i) and for each microservice, derive a continuous average resource utilization value for each microservice with respect to each resource (described below), (iii) based on (i) and for each microservice, derive a minimum and a maximum resource utilization values for each microservice with respect to each resource (described below), (iv) generate a grouping of resources including average, minimum, and maximum resource utilization values, (v) identify, within each group, health of each microservice based on average, minimum, and maximum resource utilization values, (vi) provide identified health of each microservice to other entities (e.g., 220), (vii) monitor performance of each microservice by obtaining telemetry data about each microservice, (viii) based on (i), build observability (by employing a set of linear, non-linear, and/or machine learning (ML) models) for each microservice in order to identify health of each microservice, (ix) based on (i), automatically react and generate alerts if one of the predetermined maximum resource utilization value thresholds is exceeded, and (x) store monitored resource utilization data of each microservice in storage (discussed below) to generate a resource utilization map (discussed below).

In one or more embodiments, the obtained information may specify one or more metrics, for example (but not limited to): a computing functionality of a microservice (e.g., microservice A's CPU utilization is 26%, microservice B's GPU utilization is 38%, etc.), an amount of storage or memory (e.g., stack memory, heap memory, cache memory, etc.) resource utilized by a microservice, a certain file operation performed by a microservice, an amount of networking resource utilized by a microservice to perform a network operation (e.g., to publish and coordinate inter-process communications), an amount of bare metal communication executed by a microservice (e.g., input/output (I/O) operations executed by a microservice per second), a quantity of file descriptors (e.g., an unsigned integer that identifies an open file in an OS) utilized by a process that is executed by a microservice, a quantity of threads (e.g., a term indicating the quantity of operations that may be handled by a processor at once) utilized by a process that is executed by a microservice, etc.

In one or more embodiments, the information may be obtained as they become available or by the analyzer (210) polling the data protection module (e.g., 112, FIG. 1) (by making an API call to the data protection module (e.g., 112, FIG. 1)) for new information. Based on receiving the API call from the analyzer (210), the data protection module (e.g., 112, FIG. 1) may allow the analyzer (210) to obtain the information.

The information may be obtained (or streamed) continuously (without affecting production workloads of the data protection module (e.g., 112, FIG. 1)), as they generated, or they may be obtained in batches, for example, in scenarios where (i) the analyzer (210) receives a health score calculation request (e.g., a health check request), (ii) the data protection module (e.g., 112, FIG. 1) accumulates the information and provides them to the analyzer (210) at fixed time intervals, or (iii) the data protection module (e.g., 112, FIG. 1) stores the information in its storage (or in an external entity (e.g., 120, FIG. 1)) and notifies the analyzer (210) to access the information from its storage or from the external entity. In one or more embodiments, the information may be access-protected for the transmission from the data protection module (e.g., 112, FIG. 1) to the analyzer (210), e.g., using encryption.

In one or more embodiments, the analyzer (210) may monitor service performance and resource utilization of each microservice (for, for example, troubleshooting and optimization) by obtaining (i) telemetry data about each microservice's technology stack (e.g., telemetry data about computing resources of each microservice) from the data protection module (e.g., 112, FIG. 1), and (ii) telemetry data regarding computing resources that are available for allocation from the data protection module (e.g., 112, FIG. 1) and/or from external entities. In one example, the analyzer (210) may: (i) monitor actions being performed, computation power being consumed, communications being sent or received, etc. by each microservice, (ii) monitor communications being sent or received by each microservice by intercepting them as they traverse from one microservice to another, (iii) based on the intercepted communications, determine utilization rates of one or more resources by a microservice, and (iv) store (temporarily or permanently) the resource utilization rates (e.g., including estimates, measurements, etc.) in storage (described below).

In one or more embodiments, while monitoring, the analyzer (210) may need to, for example (but not limited to): inventory one or more components of each microservice, obtain a type and a model of a component of a microservice, obtain a version of firmware or other code executing on a microservice, obtain information regarding a hardware component or a software component of the data protection module (e.g., 112, FIG. 1) that may be allocated to a microservice, obtain information specifying each microservice's interaction with one another and/or with another component of the data protection module (e.g., 112, FIG. 1), etc.

In one or more embodiments, based on one or more peaks and valleys exist in the obtained resource utilization data for each microservice, the analyzer (210) may derive a continuous average (e.g., a moving average) resource utilization value for each microservice with respect to each resource. As used herein, a "continuous average" takes, for example, the past days of values and derives the average of those days. For a 7-day continuous average, it takes the last 7 days, adds them up, and divides it by 7. In this manner, the continuous average may provide an average value of data over a period of time while minimizing the effects of peaks and valley in the data.

For example, based on the peaks and valleys of daily CPU utilization data of microservice X (where the data shows lots of peaks and valleys), which is obtained at every 15 minutes, the analyzer (210) may derive a daily continuous average CPU utilization value of microservice X across the start of data gathering (e.g., 00:15 a.m.) and the end of data gathering (e.g., 00:00 a.m.). The analyzer (210) may derive the daily continuous average CPU utilization value: (i) because it may be tough to infer how much the CPU utilization is increasing if the data shows lots of peaks and valleys and (ii) in order to obtain an accurate and consistent data for health identification of microservice X.

As yet another example, based on the peaks and valleys of daily memory utilization data of microservice Z (where the data shows lots of peaks and valleys), which is obtained at every 1 hour, the analyzer (210) may derive a daily continuous average memory utilization value of microservice Z across the start of data gathering and the end of data gathering. The analyzer (210) may derive the daily continuous average memory utilization value: (i) because it may be tough to infer how much the memory utilization is increasing if the data shows lots of peaks and valleys and (ii) in order to obtain an accurate and consistent data for health identification of microservice Z.

In one or more embodiments, based on the obtained resource utilization data for each microservice, the analyzer (210) may derive a minimum and a maximum resource utilization values for each microservice with respect to each resource. In one or more embodiments, the analyzer (210) may derive the minimum and maximum resource utilization values as a reference to infer whether the continuous average resource utilization value for each microservice is derived properly. If there is an issue with the derived continuous average resource utilization value, based on the reference, the analyzer (210) may re-derive the continuous average resource utilization value.

In one or more embodiments, as a result of the observability (said another way, based on the (i) metrics that are collected historically and (ii) average, minimum, and maximum resource utilization values for each microservice), the analyzer (210) may generate a grouping of resources. For example, Group A may specify, at least: (i) daily memory utilization values of Microservice A, Microservice B, and Microservice C, (ii) an average memory utilization value across Microservices A-C, (iii) a minimum memory utilization value across Microservices A-C, and (iv) a maximum memory utilization value across Microservices A-C.

As yet another example, Group B may specify, at least: (i) daily CPU utilization values of Microservice A, Microservice B, and Microservice C, (ii) an average CPU utilization value across Microservices A-C, (iii) a minimum CPU utilization value across Microservices A-C, and (iv) a maximum CPU utilization value across Microservices A-C. The analyzer (210) may then display, via the visualization module (240), the grouping of resources (including the above details) to a user of the data protection module (e.g., 112, FIG. 1).

In one or more embodiments, based on the grouping of resources, the analyzer (210) may employ a set of linear, non-linear, and/or ML models (e.g., a hierarchical density-based spatial clustering of applications with noise (HDBSCAN) model) to identify health of each microservice within each group. As used herein, the HDBSCAN model is a clustering (e.g., a classification) algorithm that can manage data that includes nested clusters (even in high-dimensions). To manage a given data, the HDBSCAN model may employ the following steps: (i) transform the space according to a density/sparsity, (ii) build a minimum spanning tree of a distance weighted graph, (iii) generate a cluster hierarchy of connected components, (iv) condense the cluster hierarchy based on minimum cluster size, and (v) extract one or more stable clusters from the condensed tree.

In one or more embodiments, by employing the HDBSCAN model, the analyzer (210) may, at least: (i) extract different types of density-based clusters (e.g., a memory cluster, a CPU cluster, etc.), (ii) identify a higher density region (e.g., a bottleneck region) in a cluster, (iii) identify one or more lower density regions in a cluster, (iv) identify one or more noise points that do not fall into any of the lower density or higher density regions of a cluster, (v) identify which microservices fall into a higher density region of a cluster (e.g., identify which microservice is taking more workload comparing to other microservices in a cluster), (vi) identify which microservices fall into a lower density region of a cluster (e.g., identify which microservice is taking less or normal workload comparing to other microservices in a cluster), (vii) identify which microservice's maximum resource utilization value exceeds an average utilization value of that resource across all microservices, and (viii) identify which microservice's maximum resource utilization value does not exceed an average utilization value of that resource across all microservices.

In one or more embodiments, based on how it is defined, a bottleneck region in a cluster may indicate that the microservices that are part of the bottleneck region have a health (e.g., performance) issue. For example, if a business microservice is down (because the business microservice is running out of memory), the business microservice may not be able to process any requests and may not be able to perform any operations. For this reason, the output of the HDBSCAN model may indicate that the business microservice is part of the bottleneck region of a memory cluster.

As yet another example, consider a scenario in which a business microservice is completely down (because the CPU utilization value of the business microservice exceeds a predetermined maximum CPU utilization value threshold to meet a user's requirements), but a policy microservice is still processing one or more requests and putting them in a queue for the business microservice. In this scenario, the business microservice may start to process them once comes back online (e.g., back in operation), but until that point-in-time, there may be a failure in the architecture and this failure may affect the overall performance of the architecture. For this reason, the output of the HDBSCAN model may indicate that (i) the business microservice is part of the bottleneck region of a CPU cluster and (ii) the policy microservice is part of a lower density region of the CPU cluster.

In this manner, the analyzer (210) may infer (e.g., identify) which microservice is healthy (e.g., providing a consistent performance, generating a response to a request, etc.) or which microservice is unhealthy (e.g., slowing down in terms of performance, not generating a response to a request, over-provisioned, exceeding a predetermined maximum resource utilization value threshold, etc.).

In one or more embodiments, the analyzer (210) may display, via the visualization module (240), the output of the HDBSCAN model (including the above details) to a user of the data protection module (e.g., 112, FIG. 1). While displaying, for example: (i) each cluster may be represented with a different color (e.g., red color tones may represent a memory cluster, blue color tones may represent a CPU cluster, etc.), (ii) based on (i), the microservices that fall into the bottleneck region of the memory cluster may be represented with a dark red color, (iii) based on (i), the microservices that fall into a lower density region of the CPU cluster may be represented with a pale blue color, and (iv) a noise data point (e.g., an unclustered data point) may be represented with a pure gray color (or may be represented with no color).

In one or more embodiments, based on the identified health of each microservice, the analyzer (210) may generate one or more alerts for a microservice if that microservice exceeds a predetermined maximum resource utilization value threshold. Thereafter, the analyzer (210) may store (temporarily or permanently) those alerts in the storage of the observation server (200) (in particular, in the resource utilization map (discussed below) section of the storage). In one or more embodiments, an alert may specify, for example (but not limited to): a workload mismatch for Microservice F is detected, a recommended maximum CPU utilization value is exceeded by Microservice D, etc. In one or more embodiments, alerts may be defined by a vendor of the corresponding microservice (or by the data protection module (e.g., 112, FIG. 1)), by an administrator, by another entity, or any combination thereof. The alerts may be defined based on a data protection policy.

One of ordinary skill will appreciate that the analyzer (210) may perform other functionalities without departing from the scope of the invention. When providing its functionality, the analyzer (210) may perform all, or a portion, of the methods illustrated in FIG. 3.1. The analyzer (210) may be implemented using hardware, software, or any combination thereof.

In one or more embodiments, the tagging engine (220) may include functionality to: (i) obtain (or receive) the identified health of each microservice (as an input) from the analyzer (210), (ii) based on the input, tag (e.g., label) each microservice for troubleshooting and optimization purposes, and (iii) store (temporarily or permanently) the tagging information of each microservice in the storage of the observation server (200) (in particular, in the microservices data (discussed below) section of the storage).

In one or more embodiments, in order to tag a microservice based on its identified health, the tagging engine (220) may, for example: (i) employ a set of linear, non-linear, and/or ML models, or (ii) include one or more configuration instructions. By employing a model or based on configuration instructions, the tagging engine (220) may, for example (but not limited to): tag a microservice (e.g., Microservice A) as a "LOW" performing microservice (because Microservice A is part of a lower density region of a CPU cluster), tag a microservice (e.g., Microservice B) as a "HIGH" performing microservice (because Microservice B is part of the bottleneck region of a memory cluster), etc.

In one or more embodiments, if the model that is used by the tagging engine (220) is not operating properly (e.g., is not performing a proper tagging operation), the model may be re-trained using any form of training data and/or the model may be updated periodically as there are improvements in the model (e.g., the model is trained using more appropriate training data).

In one or more embodiments, the configuration instructions may be set (and updated) by a manufacturer of the tagging engine (220). Alternatively, the configuration instructions may also be set by an administrator of the tagging engine (220).

One of ordinary skill will appreciate that the tagging engine (220) may perform other functionalities without departing from the scope of the invention. When providing its functionality, the tagging engine (220) may perform all, or a portion, of the methods illustrated in FIG. 3.1. The tagging engine (220) may be implemented using hardware, software, or any combination thereof.

In one or more embodiments, the prediction engine (230) may include functionality to: (i) obtain (or receive) the tagging information of each microservice (as input) from the storage of the observation server (200), (ii) employ a set of linear, non-linear, and/or ML models (e.g., a conformal prediction model) to obtain a confidence score associated with a tag of a microservice, (iii) generate a ranked list of tagged microservices based on their respective confidence scores, (iv) based on the ranked list, send one or more recommendations to a user of the data protection module (e.g., 112, FIG. 1) to manage the health of microservices, and (v) store (temporarily or permanently) the ranked list and recommendations in the storage of the observation server (200) (in particular, in the microservices data (discussed below) section of the storage).

As used herein, "conformal prediction" may refer to predicting a label to a given test observation based on past experiences. In one or more embodiments, the prediction engine (230) may execute the model based on the below parameters and steps:

(a) Input: (i) A training dataset: $(x_i, y_i) i \in I_{train}$, (ii) a calibration dataset: $(x_i, y_i) i \in I_{calibration}$, (iii) Y: the set of possible tags (e.g., HIGH, LOW, etc.), (iv) a significance level (α), (v) a classifier (C), (vi) a non-conformity score (r), and (vii) a new point ($X_{new}$)

(b) Output: (i) $C_{conformal}(X_{new})$ and (ii) a prediction region at $X_{new}$ (c) Fit the classifier on the training dataset→C on ($x_i$, $y_i$)∈$I_{train}$ (d) Execute the non-conformity score on the calibration data→r on ($x_i$, $y_i$)∈$I_{calibration}$ (e) For y∈Y: (i) let $Y_{new}$ (the probability predicted by C for $X_{new}$) to belong to class Y and (ii) compare r($X_{new}$, Y)=1−$Y_{new}$ and the associated p-value $p_y(X_{new})$ (f) Return $C_{conformal}(X_{new})$={y∈Y|$p_y(X_{new})$≥α}, where $$p_y(x) = \frac{|\{i \in I \mid r(x_i, y) \geq r(x, y) \land y_i = y\}|}{|\{i \in I \mid y_i = y\}|}$$

In one or more embodiments, by implementing the conformal prediction model, the prediction engine (230) may obtain a confidence score associated with a tag of a microservice. For example, the prediction engine (230) may obtain the following confidence scores (in Table 1):

TABLE 1

| Identifier of a Microservice | Tag | Confidence Score |
| --- | --- | --- |
| Microservice 1 | LOW | 0.027 |
| Microservice 2 | LOW | 0.191 |
| Microservice 3 | HIGH | 0.460 |
| Microservice 4 | HIGH | 0.581 |
| Microservice 5 | LOW | 0.072 |
| Microservice 6 | HIGH | 0.368 |
| Microservice 7 | HIGH | 0.862 |
| Microservice 8 | HIGH | 0.273 |
| Microservice 9 | HIGH | 0.435 |
| Microservice 10 | HIGH | 0.660 |
| Microservice 11 | HIGH | 0.884 |
| Microservice 12 | HIGH | 0.578 |

Thereafter, the prediction engine (230) may generate a ranked list of tagged microservices based on their respective confidence scores. In one or more embodiments, the prediction engine (230) may employ any model (e.g., Scikit-Criteria® ranking comparison model) to rank the data (e.g., the tag and confidence score) of microservices. For example, based on Table 1 and employing the Scikit-Criteria® ranking comparison model, the prediction engine (230) may obtain the following ranked list (Table 2):

TABLE 2

| Identifier of a Microservice | Tag | Confidence Score |
| --- | --- | --- |
| Microservice 11 | HIGH | 0.884 |
| Microservice 7 | HIGH | 0.862 |
| Microservice 10 | HIGH | 0.660 |
| Microservice 4 | HIGH | 0.581 |
| Microservice 12 | HIGH | 0.578 |
| Microservice 3 | HIGH | 0.460 |
| Microservice 9 | HIGH | 0.435 |
| Microservice 6 | HIGH | 0.368 |
| Microservice 8 | HIGH | 0.273 |
| Microservice 2 | LOW | 0.191 |
| Microservice 5 | LOW | 0.072 |
| Microservice 1 | LOW | 0.027 |

In one or more embodiments, based on the ranked list, the prediction engine (230) may identify, at least: (i) healthy microservices (e.g., based on Table 2, the prediction engine (230) may identify Microservices 1, 2, and 5 as healthy microservices) and (ii) unhealthy microservices (e.g., based on Table 2, the prediction engine (230) may identify Microservices 3, 4, 6, and 7-12 as unhealthy microservices).

In one or more embodiments, in order to manage the health of microservices (in particular, the health of the unhealthy microservices) and resolve bottlenecks without affecting the operation of the entire distributed computing architecture, one or more preventive (and proactive) actions may be taken. In one or more embodiments, a preventive action may be, for example (but not limited to): performing workload redistribution among microservices (e.g., high performance load balancing) (for example, to prevent workload mismatch between microservices and to manage the overall operation of the architecture), reducing the quantity of unnecessary REST API calls (for example, to prevent unnecessary memory utilization and to improve the likelihood that the unhealthy microservices are healthy again), modifying (e.g., adding, removing, etc.) resources allocated to a microservice (for example, to ensure highly available microservices), modifying a predetermined maximum resource utilization value threshold (e.g., increasing a predetermined maximum CPU utilization value threshold from 70% to 88% so that Microservice A can take more workloads), testing (in terms of resource utilization and workload assignment) a new microservice that will be added into the architecture before causing an impact on the architecture, etc.

In one or more embodiments, based on a ranked list and one or more alerts (that are obtained from the resource utilization map), the prediction engine (230) may send a recommendation (as a request or a command) to a user of the data protection module (e.g., 112, FIG. 1). In one or more embodiments, a recommendation may specify, for example (but not limited to): types and quantities of resources to allocate to unhealthy microservices, one or more preventive actions to implement, a security model to be employed, a communication model to be employed, user/entity access credentials for use of a microservice, an information usable to place a microservice into a state where the microservice provides desired computer-implemented services, etc.

In one or more embodiments, a recommendation may specify resource allocations in light of an intent-based model. For example, rather than indicating specific hardware components (or portions thereof) to be allocated to a particular microservice, the recommendation may only specify that a microservice needs to be instantiated having predetermined characteristics, that the microservice will perform certain workloads or execute certain applications, and/or that the microservice be able to perform one or more predetermined functionalities. In such a scenario, the data protection module (e.g., 112, FIG. 1) may determine (i) how to instantiate the microservice (e.g., which resources to allocate, how to allocate the resources (e.g., virtualization, emulation, redundant workload performance, data integrity models to employ, etc.) and (ii) which resources are available to be allocated.

In one or more embodiments, in addition to the functionalities described above in reference to FIG. 1, upon receiving a recommendation (or multiple recommendations with minimum amount of latency) from the prediction engine (230), the data protection module (e.g., 112, FIG. 1) may provide microservice management services. The data protection module (e.g., 112, FIG. 1) may receive the recommendation as pre-loaded instructions (present in the storage of the observation server (200)) and/or via other methods. In one or more embodiments, the microservice management services may include, for example (but not limited to):

performing workload redistribution among microservices (for example, to prevent workload mismatch between microservices and a possible failure in the architecture), determining resources to allocate to instantiate a resource redistribution process, reducing the quantity of unnecessary REST API calls (to prevent, for example, unnecessary CPU utilization), cooperating with the prediction engine (230) while allocating the determined resources, etc.

In one or more embodiments, the prediction engine (230) may include a recommendation monitoring service to monitor whether a provided recommendation is implemented by a user of the data protection module (e.g., 112, FIG. 1). The recommendation monitoring service may be a computer program that may be executed on the underlying hardware of the prediction engine (230). The recommendation monitoring service may be designed and configured to facilitate remote access to check the status (e.g., healthy after implementing the provided recommendation, still unhealthy even after implementing the provided recommendation, etc.) of each microservice. Based on the monitoring, if the status of an unhealthy microservice is still unhealthy even after implementing a provided recommendation, the prediction engine (230) may provide a second recommendation to the user of the data protection module (e.g., 112, FIG. 1).

One of ordinary skill will appreciate that the prediction engine (230) may perform other functionalities without departing from the scope of the invention. When providing its functionality, the prediction engine (230) may perform all, or a portion, of the methods illustrated in FIG. 3.2. The prediction engine (230) may be implemented using hardware, software, or any combination thereof.

In one or more embodiments, the visualization module (240) may include functionality to: (i) receive a grouping of resources (and corresponding details), and display the aforementioned content on its GUI and (ii) receive output of the HDBSCAN model (and corresponding details), and display the aforementioned content on its GUI (for example, in a separate window(s) on its GUI). In one or more embodiments, the visualization module (240) may concurrently display one or more separate windows on its GUI. Further, the visualization module (240) may include functionality to generate visualizations of methods illustrated in FIGS. 3.1 and 3.2.

One of ordinary skill will appreciate that the visualization module (240) may perform other functionalities without departing from the scope of the invention. Although the visualization module (240) is shown as part of the observation server (200), the visualization module (240) may also be implemented separately in the form of hardware, software, or any combination thereof.

In one or more embodiments, the observation server (200) may include storage (not shown) (or may utilize the storage (e.g., 120, FIG. 1) for at least the operations discussed below). The storage may be implemented using physical devices that provide data storage services (e.g., storing data and providing copies of previously stored data). The devices that provide data storage services may include hardware devices and/or logical devices. For example, the storage may include any quantity and/or combination of memory devices (i.e., volatile storage), long term storage devices (i.e., persistent storage), other types of hardware devices that may provide short-term and/or long-term data storage services, and/or logical storage devices (e.g., virtual persistent storage/virtual volatile storage).

For example, the storage may include a memory device (e.g., a dual in-line memory device), in which data is stored and from which copies of previously stored data are provided. As yet another example, the storage may include a persistent storage device (e.g., an SSD), in which data is stored and from which copies of previously stored data is provided. As yet another example, the storage may include (i) a memory device in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data).

Further, the storage may also be implemented using logical storage. A logical storage (e.g., virtual disk) may be implemented using one or more physical storage devices whose storage resources (all, or a portion) are allocated for use using a software layer. Thus, a logical storage may include both physical storage devices and an entity executing on a processor or another hardware device that allocates storage resources of the physical storage devices.

In one or more embodiments, the storage may store (temporarily or permanently) data structures including, for example, microservices data, a resource map, and a resource utilization map. Each of these data structures is discussed below.

In one or more embodiments, the microservices data may specify, for example (but not limited to): an identifier of a microservice and a resource that have been allocated to that microservice, workload performance data of a microservice, a resource utilization rate of a microservice over time, information regarding an operation of a microservice that may be utilized to manage the operation of that microservice, information regarding duplicative data stored by a microservice for data integrity purposes, information regarding redundantly performed workloads by a microservice to meet a user's requirements, information regarding an encryption scheme utilized by a microservice to prevent unauthorized access of data, an amount of storage or memory resource utilized by a microservice, an amount of bare metal communications executed by a microservice, a network connectivity information of a microservice, etc.

In one or more embodiments, the microservices data may be maintained by, for example, the analyzer (210). The analyzer (210) may add, remove, and/or modify information included in the microservices data to cause the information included in the microservices data to reflect the state of the microservices. Data structures of the microservices data may be implemented using, for example, lists, tables, unstructured data, structured data, etc. While described as being stored locally, the microservices data may be stored remotely (e.g., in the storage (e.g., 120, FIG. 1)) and may be distributed across any number of devices without departing from the scope of the invention.

In one or more embodiments, the resource map may be implemented using one or more data structures that include information regarding resources of the data protection module (e.g., 112, FIG. 1) and/or each microservice' own resources. The resource map may specify, for example (but not limited to): a type of a resource (e.g., a hardware resource, a logical resource, a CPU, memory, etc.) that is available for allocation and/or that is already allocated to a microservice, a quantity of a resource that is available for allocation and/or that is already allocated to a microservice, etc. The resource map may be used to provide data to management entities such as, for example, the data protection module (e.g., 112, FIG. 1).

In one or more embodiments, the resource map may be maintained by, for example, the analyzer (210). The analyzer (210) may add, remove, and/or modify information included in the resource map to cause the information included in the resource map to reflect the state of the microservices and/or the data protection module (e.g., 112, FIG. 1). The data structures of the resource map may be implemented using, for example, lists, tables, unstructured data, structured data, etc. While described as being stored locally, the resource map may be stored remotely and may be distributed across any number of devices without departing from the scope of the invention.

In one or more embodiments, the resource utilization map may be implemented using one or more data structures that includes information regarding the utilization of resources of the data protection module (e.g., 112, FIG. 1) and/or each microservice' own resources. The resource utilization map may specify, for example (but not limited to): an identifier of a microservice, an identifier of a resource, an identifier of a resource that has been utilized by a microservice, etc.

The resource utilization map may specify the resource utilization by any means. For example, the resource utilization map may specify an amount of utilization, resource utilization rates over time, power consumption of microservices while utilized by the data protection module (e.g., 112, FIG. 1), workloads performed using microservices, etc. The resource utilization map may include other types of information used to quantify the utilization of resources by microservices without departing from the scope of the invention.

In one or more embodiments, the resource utilization map may be maintained by, for example, the analyzer (210). The analyzer (210) may add, remove, and/or modify information included in the resource utilization map to cause the information included in the resource utilization map to reflect the current utilization of the resources. Data structures of the resource utilization map may be implemented using, for example, lists, tables, unstructured data, structured data, etc. While described as being stored locally, the resource utilization map may be stored remotely and may be distributed across any number of devices without departing from the scope of the invention.

While the storage has been described as including a limited number and type of data, the storage may store additional, less, and/or different data without departing from the scope of the invention.

In one or more embodiments, the analyzer (210), tagging engine (220), prediction engine (230), and visualization module (240) may be utilized in isolation and/or in combination to provide the above-discussed functionalities. These functionalities may be invoked using any communication model including, for example, message passing, state sharing, memory sharing, etc. By doing so, the observation server (200) may address issues related to microservices proactively.

FIGS. 3.1 and 3.2 show a method for identifying health of one or more microservices based on their resource utilizations in accordance with one or more embodiments of the invention. While various steps in the method are presented and described sequentially, those skilled in the art will appreciate that some or all of the steps may be executed in different orders, may be combined or omitted, and some or all steps may be executed in parallel without departing from the scope of the invention.

Turning now to FIG. 3.1, the method shown in FIG. 3.1 may be executed by, for example, the above-discussed observation server (e.g., 200, FIG. 2). Other components of the system (100) illustrated in FIG. 1 may also execute all or part of the method shown in FIG. 3.1 without departing from the scope of the invention.

In Step 300, the observation server (or more specifically, e.g., the analyzer (e.g., 210, FIG. 2)) obtains (e.g., gathers) resource utilization data of microservices executing on the data protection module (e.g., 112, FIG. 1). In one or more embodiments, the obtained resource utilization data may specify one or more metrics, for example (but not limited to): an amount of processing resource utilized by a microservice, an amount of storage or memory resource utilized by a microservice, a certain file operation performed by a microservice, an amount of networking resource utilized by a microservice to perform a network operation, an amount of bare metal communication executed by a microservice, a quantity of file descriptors utilized by a process that is executed by a microservice, a quantity of threads utilized by a process that is executed by a microservice, etc.

In one or more embodiments, the analyzer may obtain the resource utilization data (e.g., key performance metrics) of microservices by, for example (but not limited to): monitoring actions being performed, computation power being consumed, communications being sent or received, etc. by each microservice, monitoring communications being sent or received by each microservice by intercepting them as they traverse from one microservice to another, determining (based on intercepted communications) utilization rates of one or more resources by a microservice, etc. Additional details of the resource utilization data gathering process are described above in reference to FIG. 2.

In Step 302, based on the obtained data (in Step 300) and for each microservice, the observation server (or more specifically, e.g., the analyzer) derives a continuous average resource utilization value for each microservice with respect to each resource. Details of the continuous averaging process are described above in reference to FIG. 2.

In Step 304, based on the obtained data (in Step 300) and for each microservice, the observation server (or more specifically, e.g., the analyzer) also derives a minimum and a maximum resource utilization values for each microservice with respect to each resource. In one or more embodiments, the analyzer may derive the minimum and maximum resource utilization values as a reference to infer whether the continuous average resource utilization value for each microservice is derived properly (in Step 302). If there is an issue with the derived continuous average, based on the reference, the analyzer may re-derive the continuous average.

In Step 306, based on the (i) metrics that are collected historically and (ii) average, minimum, and maximum resource utilization values for each microservice, the observation server (or more specifically, e.g., the analyzer) generates a grouping of resources. Details of the grouping process are described above in reference to FIG. 2.

In Step 308, based on the average, minimum, and maximum resource utilization values for each microservice (said another way, based on the grouping of resources), the observation server (or more specifically, e.g., the analyzer) identifies health of each microservice within each group. In one or more embodiments, in order to identify health of each microservice, the analyzer may employ a set of linear, non-linear, and/or ML models (e.g., the HDBSCAN model). The analyzer may then display, via the visualization module (e.g., 240, FIG. 2), the output of the HDBSCAN model to a user of the data protection module. Details of the health identification process and the HDBSCAN model are described above in reference to FIG. 2.

In Step 310, based on the identified health of each microservice (in Step 308), the observation server (or more specifically, e.g., the tagging engine (e.g., 220, FIG. 2)) tags each microservice accordingly. In one or more embodiments, in order to tag a microservice based on its identified health, the tagging engine may, for example: (i) employ a set of linear, non-linear, and/or ML models, or (ii) include one or more configuration instructions. By employing a model or based on configuration instructions, the tagging engine may, for example (but not limited to): tag a microservice (e.g., Microservice A) as a "LOW" performing microservice, tag a microservice (e.g., Microservice B) as a "HIGH" performing microservice, etc. Additional details of the tagging process are described above in reference to FIG. 2.

Turning now to FIG. 3.2, the method shown in FIG. 3.2 may be executed by, for example, the above-discussed observation server. Other components of the system (100) illustrated in FIG. 1 may also execute all or part of the method shown in FIG. 3.2 without departing from the scope of the invention.

In Step 312, the observation server (or more specifically, e.g., the prediction engine (e.g., 230, FIG. 2)) obtains a confidence score for each of the tagged microservices (in Step 310 of FIG. 3.1). In one or more embodiments, the prediction engine may first obtain (or receive) the tagging information of each microservice (as input) from the storage of the observation server. The prediction engine may then employ a set of linear, non-linear, and/or ML models (e.g., a conformal prediction model) to obtain a confidence score associated with a tag of a microservice. Additional details of obtaining a confidence score are described above in reference to FIG. 2.

In Step 314, the observation server (or more specifically, e.g., the prediction engine) generates a ranked list of tagged microservices based on the corresponding confidence scores (obtained in Step 312). In one or more embodiments, the prediction engine may employ any model (e.g., Scikit-Criteria® ranking comparison model) to generate a ranked list of tagged microservices based on their respective confidence scores. Thereafter, the prediction engine may display, via the visualization module, the ranked list of tagged microservices to the user of the data protection module. Additional details of the ranking process are described above in reference to FIG. 2.

In Step 316, based on the ranked list, the observation server (or more specifically, e.g., the prediction engine) sends a recommendation, via the GUI of the data protection module, to a user of the data protection module to manage the health of microservices (or more specifically, to improve health of unhealthy microservices). In this manner, for example, a bottleneck (e.g., workload mismatch between microservices) that is occurred due to a recent spike in demand in resource utilization values of a microservice may be resolved proactively (without affecting the entire architecture and data protection module) by taking a preventive action (e.g., performing workload redistribution, reducing the quantity of unnecessary REST API calls, etc.). Additional details of the recommendation and preventive action are described above in reference to FIG. 2.

In one or more embodiments, the prediction engine may then store (temporarily or permanently) the recommendation in the storage of the observation server.

In one or more embodiments, the method may end following Step 316.

Start of Example

The following section describes an example of one or more embodiments. The example, illustrated in FIGS. 4.1-4.4, is not intended to limit the scope of the embodiments disclosed herein and is independent from any other examples discussed in this application.

Turning to the example, consider a use case in which three microservices (e.g., Microservice 1, Microservice 2, and Microservice 3) are deployed into an example data protection module (400). Initially, FIG. 4.1 shows a diagram of the example data protection module (400). For the sake of brevity, not all components of the example data protection module (400) may be illustrated in FIG. 4.1.

Assume here that, at time 0 (t=0) (e.g., 14 Nov. 2022 at 04:15 a.m.), the observation server identifies that: (i) CPU utilization (or usage) value of Microservice 1 is 25% and memory usage value of Microservice 1 is 15%, (ii) CPU usage value of Microservice 2 is 35% and memory usage value of Microservice 2 is 25%, and (iii) CPU usage value of Microservice 3 is 35% and memory usage value of Microservice 3 is 25%. Separately, assume here that a predetermined maximum CPU utilization value threshold (or a predetermined "unhealthy" CPU usage value threshold) is 70% and a predetermined "unhealthy" memory usage value threshold is 60%.

At this time (at t=0), all microservices are directed to (e.g., instructed to) provide their corresponding computer-implemented services to users.

Turning now to FIG. 4.2, FIG. 4.2 shows a diagram of the example data protection module (400) at a later point-in-time (at t=1 (e.g., 14 Nov. 2022 at 04:30 a.m.)). Assume here that, at t=1, the observation server identifies that: (i) the CPU usage value of Microservice 1 is increased to 85% and memory usage value of Microservice 1 is increased to 75% (because of a spike in demand), (ii) the CPU usage value of Microservice 2 is decreased to 30% and memory usage value of Microservice 2 is decreased to 20%, and (iii) the CPU usage value of Microservice 3 is still 35% and memory usage value of Microservice 3 is still 25%.

At this time (at t=1), all microservices are directed to provide their corresponding computer-implemented services to the users.

Turning now to FIG. 4.3, FIG. 4.3 shows a diagram of the example data protection module (400) at a later point-in-time (at t=2 (e.g., 14 Nov. 2022 at 04:45 a.m.)). Assume here that, at t=2, the observation server identifies that: (i) the CPU usage value of Microservice 1 is still 85% and memory usage value of Microservice 1 is still to 75%, (ii) the CPU usage of Microservice 2 is still 30% and memory usage value of Microservice 2 is still 20%, and (iii) the CPU usage value of Microservice 3 is still 35% and memory usage value of Microservice 3 is still 25%.

Thereafter, for the actions performed between t=0 and t=2, the observation server (i) derives the average CPU usage value (among Microservices 1-3) as 43.8% and (ii) derives the average memory usage value (among Microservices 1-3) as 33.8%. Based on these data, the observation server makes a determination that: (i) the CPU usage value of Microservice 1 exceeds the predetermined "unhealthy" CPU usage value threshold (85%>70%), (ii) the memory usage value of Microservice 1 exceeds the predetermined "unhealthy" memory usage value threshold (75%>60%), (iii) the CPU usage value of Microservice 1 exceeds the average CPU usage value (85%>43.8%), and (iv) the memory usage value of Microservice 1 exceeds the average memory usage value (75%>33.8%).

The observation server then tags (i) Microservice 1 as "unhealthy", (ii) Microservice 2 as "healthy", and (iii) Microservice 3 as "healthy".

At this time (at t=2), all microservices (except Microservice 1) are directed to provide their corresponding computer-implemented services to the users.

Turning now to FIG. 4.4, FIG. 4.4 shows a diagram of the example data protection module (400) at yet a later point-in-time (at t=3 (e.g., 14 Nov. 2022 at 05:15 a.m.)). Following the determination made by the observation server, the observation server sends a recommendation to a user of the example data protection module (400) to improve health of Microservice 1, in which the recommendation specifies: "perform workload redistribution among Microservices 1-3". In response to the recommendation, the user of the example data protection module (400) performs the workload redistribution among Microservices 1-3.

Thereafter, at t=3, the observation server identifies that (after the workload redistribution): (i) the CPU usage value of Microservice 1 is reduced to 45% and memory usage value of Microservice 1 is reduced to 40%, (ii) the CPU usage value of Microservice 2 is increased to 50% and memory usage value of Microservice 2 is increased to 37.5%, and (iii) the CPU usage value of Microservice 3 is increased to 55% and memory usage value of Microservice 3 is increased to still 42.5%.

Based on these data, the observation server makes a second determination that: (i) health of Microservice 1 is improved (unhealthy→healthy) because: (a) the CPU usage value of Microservice 1 is below the predetermined "unhealthy" CPU usage value threshold (45%<70%), (b) the memory usage value of Microservice 1 is below the predetermined "unhealthy" memory usage value threshold (40%<60%), (c) the CPU usage value of Microservice 1 is below a second average CPU usage value (45%<50%) (which is derived after the redistribution), (d) the memory usage value of Microservice 1 is equal to a second average memory usage value (40%=40%) (which is derived after the redistribution); (ii) Microservice 2 is still healthy because: (a) the CPU usage value of Microservice 2 is still below the predetermined "unhealthy" CPU usage value threshold (50%<70%), (b) the memory usage value of Microservice 2 is still below the predetermined "unhealthy" memory usage value threshold (37.5%<60%), (c) the CPU usage value of Microservice 2 is equal to the second average CPU usage value (50%=50%), and (d) the memory usage value of Microservice 2 is below the second average memory usage value (37.5%<40%); and (iii) Microservice 3 is still healthy because: (a) the CPU usage value of Microservice 3 is still below the predetermined "unhealthy" CPU usage value threshold (55%<70%), (b) the memory usage value of Microservice 3 is still below the predetermined "unhealthy" memory usage value threshold (42.5%<60%), (c) the CPU usage value of Microservice 3 is close to the second average CPU usage value (55%>50%), and (d) the memory usage value of Microservice 3 is close to the second average memory usage value (42.5%>40%).

At this time (at t=3), in response to the workload redistribution, all microservices are directed to provide their corresponding computer-implemented services to the users. End of Example Turning now to FIG. 5, FIG. 5 shows a diagram of a computing device in accordance with one or more embodiments of the invention.

In one or more embodiments of the invention, the computing device (500) may include one or more computer processors (502), non-persistent storage (504) (e.g., volatile memory, such as RAM, cache memory), persistent storage (506) (e.g., a hard disk, an optical drive such as a CD drive or a DVD drive, a Flash memory, etc.), a communication interface (512) (e.g., Bluetooth interface, infrared interface, network interface, optical interface, etc.), an input device(s) (510), an output device(s) (508), and numerous other elements (not shown) and functionalities. Each of these components is described below.

In one or more embodiments, the computer processor(s) (502) may be an integrated circuit for processing instructions. For example, the computer processor(s) (502) may be one or more cores or micro-cores of a processor. The computing device (500) may also include one or more input devices (510), such as a touchscreen, keyboard, mouse, microphone, touchpad, electronic pen, or any other type of input device. Further, the communication interface (512) may include an integrated circuit for connecting the computing device (500) to a network (e.g., a LAN, a WAN, Internet, mobile network, etc.) and/or to another device, such as another computing device.

In one or more embodiments, the computing device (500) may include one or more output devices (508), such as a screen (e.g., a liquid crystal display (LCD), plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing devices exist, and the aforementioned input and output device(s) may take other forms.

The problems discussed throughout this application should be understood as being examples of problems solved by embodiments described herein, and the various embodiments should not be limited to solving the same/similar problems. The disclosed embodiments are broadly applicable to address a range of problems beyond those discussed herein.

While embodiments discussed herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method for managing a data protection module, the method comprising:

obtaining resource utilization data of a first microservice and a second microservice, wherein the first microservice and the second microservice execute on the data protection module, wherein the resource utilization data specifies a quantity of file descriptors utilized by a first process that is executed by the first microservice and a quantity of threads utilized by a second process that is executed by the second microservice, wherein the resource utilization data is obtained by intercepting a communication being sent from the first microservice to the second microservice;

deriving, based on the resource utilization data and for the first microservice and the second microservice, resource utilization values for each resource, wherein the resource utilization values comprise an average resource utilization value, a minimum resource utilization value, and a maximum resource utilization value;

identifying, based on the resource utilization values, health of the first microservice and the second microservice;

tagging, based on the identified health of the first microservice and the second microservice and configuration instructions set by a manufacturer, the first microservice and the second microservice;

obtaining a first confidence score associated with the tag of the first microservice and a second confidence score associated with the tag of the second microservice;

generating a ranked list based on the first confidence score and the second confidence score, wherein the ranked list comprises the first microservice and the second microservice ordered based on their respective confidence scores; and sending, based on the ranked list, a recommendation to a user of the data protection module to manage the health of the first microservice and the second microservice.

2. The method of claim 1, wherein the resource comprises at least one selected from a group consisting of a processing resource, a memory resource, and a networking resource.

3. The method of claim 1, wherein the average resource utilization value is a continuous average resource utilization value.

4. The method of claim 1, wherein the first microservice provides at least a data protection service, wherein the data protection service protects application data of a virtual machine.

5. The method of claim 4, wherein the second microservice provides at least an orchestration service, wherein the orchestration service orchestrates the data protection service.

6. The method of claim 1, wherein the first microservice provides at least an authentication service, wherein the authentication service authenticates a user's credentials before performing a data protection operation for the user.

7. The method of claim 1, wherein the tag of the first microservice specifies that the first microservice is an unhealthy microservice, wherein being the unhealthy microservice signifies that the first microservice could not generate a response to a request of the second microservice.

8. The method of claim 1, wherein the tag of the second microservice specifies that the second microservice is a healthy microservice, wherein being the healthy microservice signifies that the second microservice generates a response to a request of the first microservice.

9. The method of claim 1, wherein the health of the first microservice and the second microservice are identified using a hierarchical density-based spatial clustering of applications with noise (HDBSCAN) model.

10. The method of claim 1, wherein the confidence score of the tagged first microservice is obtained using a conformal prediction model.

11. A non-transitory computer readable medium comprising computer readable program code, which when executed by a computer processor enables the computer processor to perform a method for managing a data protection module, the method comprising:

obtaining resource utilization data of a first microservice and a second microservice, wherein the first microservice and the second microservice execute on the data protection module, wherein the resource utilization data specifies a quantity of file descriptors utilized by a first process that is executed by the first microservice and a quantity of threads utilized by a second process that is executed by the second microservice, wherein the resource utilization data is obtained by intercepting a communication being sent from the first microservice to the second microservice;

deriving, based on the resource utilization data and for the first microservice and the second microservice, resource utilization values for each resource, wherein the resource utilization values comprise an average resource utilization value, a minimum resource utilization value, and a maximum resource utilization value;

identifying, based on the resource utilization values, health of the first microservice and the second microservice;

tagging, based on the identified health of the first microservice and the second microservice and configuration instructions set by a manufacturer, the first microservice and the second microservice;

obtaining a first confidence score associated with the tag of the first microservice and a second confidence score associated with the tag of the second microservice;

generating a ranked list based on the first confidence score and the second confidence score, wherein the ranked list comprises the first microservice and the second microservice ordered based on their respective confidence scores; and sending, based on the ranked list, a recommendation to the data protection module to manage the health of the first microservice and the second microservice.

12. The non-transitory computer readable medium of claim 11, wherein the resource comprises at least one selected from a group consisting of a processing resource, a memory resource, and a networking resource.

13. The non-transitory computer readable medium of claim 11, wherein the average resource utilization value is a continuous average resource utilization value.

14. The non-transitory computer readable medium of claim 11, wherein the first microservice provides at least a data protection service, wherein the data protection service protects application data of a virtual machine.

15. The non-transitory computer readable medium of claim 14, wherein the second microservice provides at least an orchestration service, wherein the orchestration service orchestrates the data protection service.

16. The non-transitory computer readable medium of claim 11, wherein the first microservice provides at least an authentication service, wherein the authentication service authenticates a user's credentials before performing a data protection operation for the user.

17. The non-transitory computer readable medium of claim 11, wherein the tag of the first microservice specifies that the first microservice is an unhealthy microservice, wherein being the unhealthy microservice signifies that the first microservice could not generate a response to a request of the second microservice.

18. The non-transitory computer readable medium of claim 11, wherein the tag of the second microservice specifies that the second microservice is a healthy microservice, wherein being the healthy microservice signifies that the second microservice generates a response to a request of the first microservice.

19. A system for managing a data protection module, the system comprising:

a processor comprising circuitry;

memory comprising instructions, which when executed perform a method, the method comprising:

obtaining resource utilization data of a first microservice and a second microservice, wherein the first microservice and the second microservice execute on the data protection module,
  wherein the resource utilization data specifies a quantity of file descriptors utilized by a first process that is executed by the first microservice and a quantity of threads utilized by a second process that is executed by the second microservice,
  wherein the resource utilization data is obtained by intercepting a communication being sent from the first microservice to the second microservice;
deriving, based on the resource utilization data and for the first microservice and the second microservice, resource utilization values for each resource, wherein the resource utilization values comprise an average resource utilization value, a minimum resource utilization value, and a maximum resource utilization value;
identifying, based on the resource utilization values, health of the first microservice and the second microservice;
tagging, based on the identified health of the first microservice and the second microservice and configuration instructions set by a manufacturer, the first microservice and the second microservice;
obtaining a first confidence score associated with the tag of the first microservice and a second confidence score associated with the tag of the second microservice;
generating a ranked list based on the first confidence score and the second confidence score, wherein the ranked list comprises the first microservice and the second microservice ordered based on their respective confidence scores; and
sending, based on the ranked list, a recommendation to the data protection module to manage the health of the first microservice and the second microservice.

20. The system of claim 19, wherein the resource comprises at least one selected from a group consisting of a processing resource, a memory resource, and a networking resource.

* * * * *